United States Patent
Rafanelli et al.

(10) Patent No.: US 6,192,322 B1
(45) Date of Patent: Feb. 20, 2001

(54) MOVING OBJECT AND TRANSIENT EVENT DETECTION USING ROTATION STRIP APERTURE IMAGE MEASUREMENTS

(75) Inventors: Gerard L. Rafanelli, Fountain Valley; Susan B. Mount, Torrance, both of CA (US); Stephen K. Johnson, Herndon, VA (US); Marilyn A. Sperka, Rancho Palos Verdes, CA (US); Eric B. Jensen, Hermosa Beach, CA (US); Mark J. Rehfield, Rancho Palos Verdes, CA (US)

(73) Assignee: Raytheon Company, Lexington, MA (US)

( * ) Notice: Under 35 U.S.C. 154(b), the term of this patent shall be extended for 0 days.

(21) Appl. No.: 08/633,980

(22) Filed: Apr. 19, 1996

(51) Int. Cl.[7] .................................................... G01S 17/50
(52) U.S. Cl. ......................... 702/150; 702/193; 702/190; 342/196; 342/351
(58) Field of Search ..................................... 364/525, 484, 364/485, 424, 33, 458, 459, 514 A, 516, 517, 550, 551.01, 572, 574, 575, 576, 582, 724.11, 724.2, 726.01, 734, 825, 827, 713, 837; 342/351, 25, 53, 191, 179, 21, 52, 54, 194, 196, 197, 424, 378, 195; 348/154, 155, 413, 415, 416; 250/330–334, 201.9, 203.1, 203.2, 203.3, 203.6; 382/103, 107, 130, 280, 291, 293, 295, 307, 236; 359/399–401, 559; 324/76.14; 455/302–307, 285, 76, 165.1, 12.1; 702/75–77, 106, 109–111, 104, 94, 95, 116, 122, 124, 126, 150–153, 159, 172, 183, 147, 143, 179, 189, 190, 191, 193, 195, 197, FOR 168, FOR 170, FOR 144, FOR 150, FOR 151, FOR 164, FOR 166, FOR 131, FOR 138, FOR 139, FOR 107, FOR 108, FOR 103, FOR 104; 708/314, 323, 401, 403–405, 816, 819–821

(56) References Cited

U.S. PATENT DOCUMENTS

| | | | |
|---|---|---|---|
| 4,724,439 | * 2/1988 | Wiley et al. | 342/351 |
| 5,113,194 | * 5/1992 | Krikorian et al. | 342/196 |
| 5,243,351 | * 9/1993 | Rafanelli et al. | 342/351 |
| 5,350,911 | * 9/1994 | Rafanelli et al. | 250/201.9 |
| 5,406,501 | * 4/1995 | Florent | 364/516 |
| 5,586,202 | * 12/1996 | Ohki et al. | 382/236 |

* cited by examiner

Primary Examiner—Hal Wachsman
(74) Attorney, Agent, or Firm—Colin M. Raufer; Leonard A. Alkov; Glenn H. Lenzen, Jr.

(57) ABSTRACT

A spinning strip aperture imaging radiometer sensor system and data processing methods for detecting moving objects derived from a plurality of image frames acquired by a strip aperture imaging sensor. A moving object in any individual image frame results in a motion smear signature in the total synthesized image. The motion smear signature is processed to detect the moving objects. One embodiment of the system comprises a rotating strip aperture telescope, a two dimensional detector array that detects images in the telescope's focal plane, a rotation compensation device that prevents rotational smear during integration time of detectors of the array, a signal processor that records a plurality of image frames of a scene imaged by the telescope as it rotates around its optical axis, and that implements method(s) for detecting the moving objects present in the recorded images. A hierarchy of moving object detection processors and methods 20 is disclosed that includes spatial, temporal, spatial frequency, and temporal frequency domain detection processors, and is compatible with multi-spectral background rejection techniques. Selection of the appropriate processing procedure and method depends upon the scenario, and the effective signal to noise ratio characteristics of the moving object.

21 Claims, 4 Drawing Sheets

MOVING OBJECT AND TRANSIENT EVENT DETECTION USING ROTATION STRIP APERTURE IMAGE MEASUREMENTS

BACKGROUND

The present invention relates generally to spinning aperture radiometers and methods, and more particularly to spinning strip (partial) aperture imaging radiometers that synthesize equivalent full circular aperture images and detect moving objects from a plurality of rotating strip aperture image, or synthesized image measurements.

To provide high resolution images from space-based platforms, for example, conventional sensor architectures use active control of large, heavy, deployable optical systems. Depending upon the mission requirements and size of the primary mirror, the active control can range from periodic piston and tilt control of primary mirror segments to piston, tilt, figure, and alignment control of all optical elements of the sensor. Full aperture systems with the same resolution as the present invention have a great deal of light gathering capability because of the relatively large aperture areas. However, to place multi-meter diameter apertures into orbit, full aperture systems competing with the present invention require: segmented optical surfaces and folded support structures, if the optical system diameters are larger than the launch vehicle's fairing; complex and potentially high bandwidth adaptive optical techniques, if thin deformable mirrors are used to save weight; and complex piston and pupil matching control, if implemented as a phased array. Therefore, full aperture systems are relatively heavy and have high technical risk when compared to the present invention.

The processors and methods described herein relate to and provide for an improvement to the system capabilities of the closest prior art, referred to herein as SpinAp. The SpinAp system and processing method is described in U.S. Pat. No. 5,243,351, entitled "Full Aperture Image synthesis Using Rotating Strip Aperture Image Measurements", which is assigned to the assignee of the present invention.

SpinAp is a sensor system and data processing method that is capable of synthesizing images having resolution equivalent to a full circular aperture. The equivalent SpinAp synthesized fill circular aperture has a diameter equal to the largest correlation length associated with the strip aperture's geometry. To accurately synthesize an equivalent full aperture image, SpinAp acquires imaging data using the rotating sensor's focal plane detectors at time intervals appropriate for completely measuring the optical system passband of the equivalent full circular aperture. The images are processed by methods described in U.S. Pat. No. 5,243,351.

The commonality of the approaches between the SpinAp system and the system of the present invention (referred to as SpinAp moving object detection) arises from the use of temporally registered strip aperture measurements to synthesize images having resolution equivalent to a full circular aperture. The equivalent SpinAp synthesized full circular aperture has a diameter equal to the largest correlation length associated with the strip aperture's geometry.

To accurately synthesize an equivalent full aperture image, SpinAp acquires imaging data using the rotating sensor's focal plane detectors at time intervals appropriate for completely measuring the optical system passband of the equivalent full circular aperture. The images are processed by methods described in U.S. Pat. No. 5,243,351.

However, a moving object in the instantaneous field of view of any of the individual frames will result in a motion smear signature in the total synthesized image. Detection of the moving object is required to establish object phenomenology, such as, position, size, trajectory, velocity, acceleration, and point of origin. In addition, the detection process is a precursor to applying processors and methods to the acquired data that permit stationary image synthesis of the moving objects. Therefore, a hierarchy of moving object detection processors and methods is described herein. The hierarchy includes spatial, temporal, spatial frequency, and temporal frequency domain detection processors, which may also incorporate multi-spectral background rejection techniques. The present system makes use of the available measurements to detect moving objects in the field of view of the synthesized images, in the field of view of any pair of SpinAp individual frames, in any one of the SpinAp individual frames, or any combination. The same methods may also be applied to transient event detection.

Therefore, it would be an advantage to have modified SpinAp image processing methods that would result in lower payload weight for a given effective synthesized aperture size, while providing capability to detect moving objects in the sensor's field of view. Furthermore, it would also be advantageous to have a system having image processing and moving object detection methods that provide a lower risk, lower cost, lighter weight, and simpler fabrication deployment alternatives to deploying complex, large full circular apertures (or phased array telescopes) requiring complex adaptive optical systems for space based imaging applications.

SUMMARY OF THE INVENTION

To meet the above and other objectives, one embodiment of the present invention provides for a spinning strip radiometer imaging and detection system that is capable of detecting moving objects. The system includes a rotating strip aperture telescope that produces temporally contiguous or sequential images. The rotating strip aperture telescope typically comprises a rotating strip aperture primary reflector and a secondary reflector. A two dimensional detector array is provided to detect images located in the focal plane of the telescope. A rotation compensation device is employed to prevent rotational smear during the integration time of the detectors of the array. A signal processor is provided for recording a plurality of image frames of a target scene imaged by the telescope as the strip aperture rotates around the optical axis of the telescope, for synthesizing the equivalent full circular aperture image, and for detecting moving objects in the individual strip aperture frames, any pair of frames, the synthesized image, or any combination of individual frames and synthesized images.

The present invention thus provides for a spinning strip (partial) aperture imaging system that synthesizes equivalent full circular aperture images, and detects moving objects in the sensors field of view from a plurality of rotating strip aperture image measurements, while compensating for random, and/or systematic line of sight errors between individual strip aperture images. The present invention thus provides improved total system performance when compared to the SpinAp system of U.S. Pat. No. 5,243,351 by providing means to synthesize an equivalent full circular image, and simultaneously providing the capability to detect moving objects.

Example embodiments of SpinAp moving object detection methods are described below. Since each embodiment of the radiometer system, image synthesis, and moving object detection processing method depends upon specific mission requirements and engineering tradeoffs, the radiometer system, image synthesis, and moving object detection method incorporates means to compensate for random, and/or systematic line of sight drift between frames, and a priori and a posteriori known error sources, such as, non-isoplanatic optical system point spread functions, field point independent image smear due to image motion and finite electronic bandwidth of the detectors, and field point dependent image smear caused by uncompensated rotational motion of the image.

Embodiments of the image synthesis and detection process performed by the present invention summarized above are as follows. As the spinning strip aperture rotates around the telescope's optical axis the following occurs. The rotation compensation device counter-rotates during the detector integration time, thereby providing a temporally stationary image. An image frame is recorded and saved. If a rotating (relative to the scene) detector array architecture has been selected, the acquired frame is coordinate transformed and interpolated to a reference grid of the synthesized image. The data is Fourier transformed and stored. A new frame is recorded and saved.

An estimate of the frame-to-frame misregistration of the recorded data due to random line of sight errors is obtained. The strip aperture images, or the Fourier transforms, are corrected for their line of sight errors and are stored. The preceding steps are sequentially repeated for each strip aperture image frame, or the frames are sequentially acquired and stored, and then global estimates of the line of sight errors are determined and used to register the frames. Once any pair, or combination of pairs, of the individual strip aperture images have been corrected for the line of sight errors, the SpinAp moving object detection process may begin. In addition, once a sufficient number (as described in U.S. Pat. No. 5,243,351) of strip aperture image measurements have been acquired the image synthesis process may begin. The SpinAp moving object detection method may be performed on two, or more, synthesized images.

An embodiment of the SpinAp moving object detection method using two or more synthesized images acquired by observing the same scene spatially registers the synthesized images (if required due to line of sight errors between measurement sets), differences all possible distinct pairs of synthesized images, sums the differenced images, and passes the resulting differenced and summed data through a matched filter array and then a comparator. A moving object detection is declared when any of the outputs from the matched filter array exceed the predetermined thresholds of the comparator.

Another embodiment of the SpinAp moving object detection method using two or more individual line of sight corrected frames resulting from the observation of the same scene applies a system transfer function (STF) equalization filter to the individual frames to be differenced, differences any or all distinct pairs of equalized frames, and applies a non-common passband rejection filter to the resulting differenced data. The resulting filtered and differenced data are combined by addition to form the total summed spectrum of filtered differences. The summed spectra are inverse transformed, thereby providing a moving object signature in the spatial domain, which is transferred to a noise optimal matched filter array and a comparator. A moving object detection is declared when any of the outputs from the matched filter array exceed the predetermined thresholds of the comparator.

The noise optimal matched filter detection processor incorporates properties corresponding to the physical phenomenology of potential objects, such as, shape, size, velocity, acceleration, background to object contrast ratio, signal to noise ratio, number of objects, number of track crossings, and the like. The matched filter detection processor also incorporates a priori knowledge of the measurement noise statistics propagated through the equalization, differencing, and filtering process, as well as the unique signal measurement characteristics of the SpinAp sensor system.

The equalization, differencing, and filtering operations associated with the present invention eliminate all temporally stationary components in a common overlap passband of the individual frame images, as well as the synthesized images, leaving only a noisy signature of smeared moving objects. The performance of the moving object detection techniques is scenario dependent and is degraded by individual frame measurement noise propagated through the equalization, differencing, and filtering operations, and background leakage due to residual frame to frame, and/or synthesized image to synthesized image registration error.

Alternative embodiments of spatial (and spatial frequency) methods that are described herein correspond to applying optimal matched filters to any of the differenced frames, and combining the outputs for all possible frame differences.

While the previous embodiments are typical of SpinAp temporal domain detection methods, temporal frequency domain processes may also be employed. An embodiment of a temporal frequency domain processor utilizes a temporal sequence of the spatially registered individual SpinAp strip aperture frames obtained by observations of the same scene. The spatially registered frames are spatially Fourier transformed to a common spatial frequency grid. The common spatial frequency grid is associated with the equivalent full circular aperture SpinAp synthesized spatial frequency passband. Any or all possible spatially registered and Fourier transformed individual frame images are temporally Fourier transformed to produce a data set associating all temporal frequencies with each spatial frequency. To obtain the best possible detection performance, the temporal and spatial frequency transformed data set is transferred to a noise optimal matched filter detection processor. The matched filter detection processor incorporates a priori knowledge of the object phenomenology, signal and noise measurement statistics, as well as the unique measurement characteristics of the SpinAp sensor system. A moving object detection is declared when any of the outputs from the matched filter array exceed predetermined thresholds.

By eliminating the zero temporal frequency, the matched filter implicitly eliminates all temporally stationary components in the transformed time history of the individual frames, thereby leaving only the temporal frequency and spatial frequency signature of the moving objects. The performance of the moving object detection technique is scenario dependent and is degraded by individual frame measurement noise propagation, and background leakage due to residual frame to frame registration error.

If observational parameters permit, acceptable performance may be achieved for less than optimal approaches, whereby the optimal matched filter array and comparator can be replaced by template matched filters and a comparator, streak detectors and a comparator, or a simple single pixel or multiple pixel threshold exceedence detection processor. In this context the word pixel refers to the spatial, or the spatial frequency element of the two dimensional discrete representation of the image, or its transform.

A hierarchy of moving object detection processors and methods is provided by the present invention. The hierarchy includes spatial, temporal, spatial frequency, and temporal frequency domain detection processors, as well as, multispectral background rejection techniques. Selection of the appropriate processing procedure and method depends upon the scenario, and the effective signal to noise ratio characteristics of the moving object. The same methods may be applied to transient event detection.

Given knowledge of the strip aperture's spatial response function, the spatial response function of the detectors of the array, the noise statistics, and the temporal registrations of each of the recorded strip aperture images permits moving object detection by the sensor system and processing methods.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
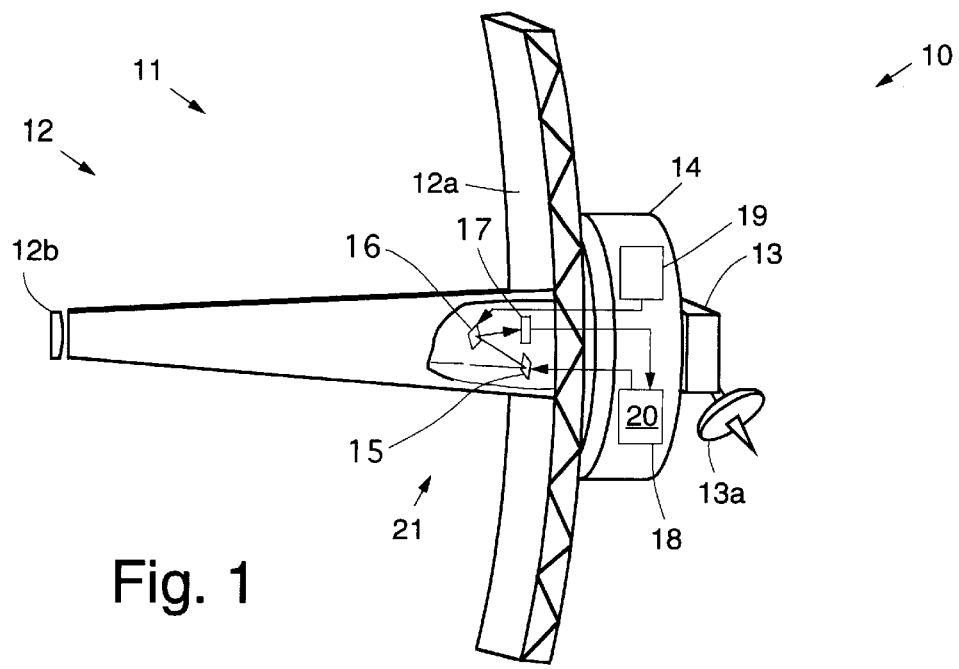
FIG. 1 illustrates a spinning aperture imaging radiometer system employing improved data processing methods in accordance with the principles of the present invention.

Referring to the drawing figures, FIG. 1 illustrates a spinning aperture imaging radiometer system 10 and data processing methods 20 (corresponding to the system described in U.S. Pat. No. 5,243,351) that is appropriately modified using the principles of the present invention. The spinning aperture imaging radiometer system 10 and data processing method 20 provides moving object detection information, and provide the capability to generate equivalent full circular imagery, while removing line of sight jitter and frame registration errors. Therefore, the system 10 and data processing methods 20 described herein provide enhancements to the SpinAp system of U.S. Pat. No. 5,243,351. The contents of U.S. Pat. No. 5,243,351 are incorporated herein by reference in its entirety.

The spinning aperture imaging radiometer system 10 comprises a rotating strip aperture telescope 11 that comprises a primary 12a and a secondary reflector 12b. A tertiary reflector (not shown) may be employed in the telescope 11 under certain circumstances. The system 10 is shown in the form of a satellite comprising a stationary section 13 having earth pointing antenna 13a. The telescope 11 is disposed on a platform 14, to which the stationary section 13 is also coupled. The spinning aperture imaging radiometer system 10 is adapted to record a number of image frames of a target scene imaged by the telescope 11 as the primary mirror 12a (comprising a strip aperture 12) rotates around the telescope's optical axis.

A line of sight stabilization mirror 15 and an image derotation device 16 are disposed along the optical path of the telescope 11 that are adapted to stabilize and derotate the image prior to its sensing by a detector array 17. The derotation device 16 counter rotates the image during the integration time of detectors comprising the detector array 17, under control of a rotation compensation controller 19, thereby providing a stationary image. The line of sight stabilization mirror 15 is used by a line of sight control system (such as may be provided by a signal processor 18 or other dedicated control system) to remove high bandwidth line of sight errors, as well as line of sight errors due to orbital dynamics of the system 10.

The target scene is imaged onto the detector array 17 located at the focal plane of the telescope 11 that is coupled to the signal processor 18 that is adapted to process the image frames. Individual image frames are processed and combined in the signal processor 18 to synthesize equivalent full circular aperture images. In the present enhanced moving object detection SpinAp system 10, the signal processor 18 (or an independent processor) is modified according to the methods of the present invention to provide for moving object detection. Detailed descriptions of the modified processing methods are illustrated with reference to FIGS. 2–5.

FIGS. 2–5 illustrate a variety of different embodiments of the sensor system 10 and processing methods 20, 20-2, 20-3, 20-4 in accordance with the principles of the present invention employed by the spinning aperture radiometer system. A particular embodiment is selected based upon the observational scenario and timelines, the amount of available a priori knowledge, and the available computational throughput of the processing chain.

Figure 2:
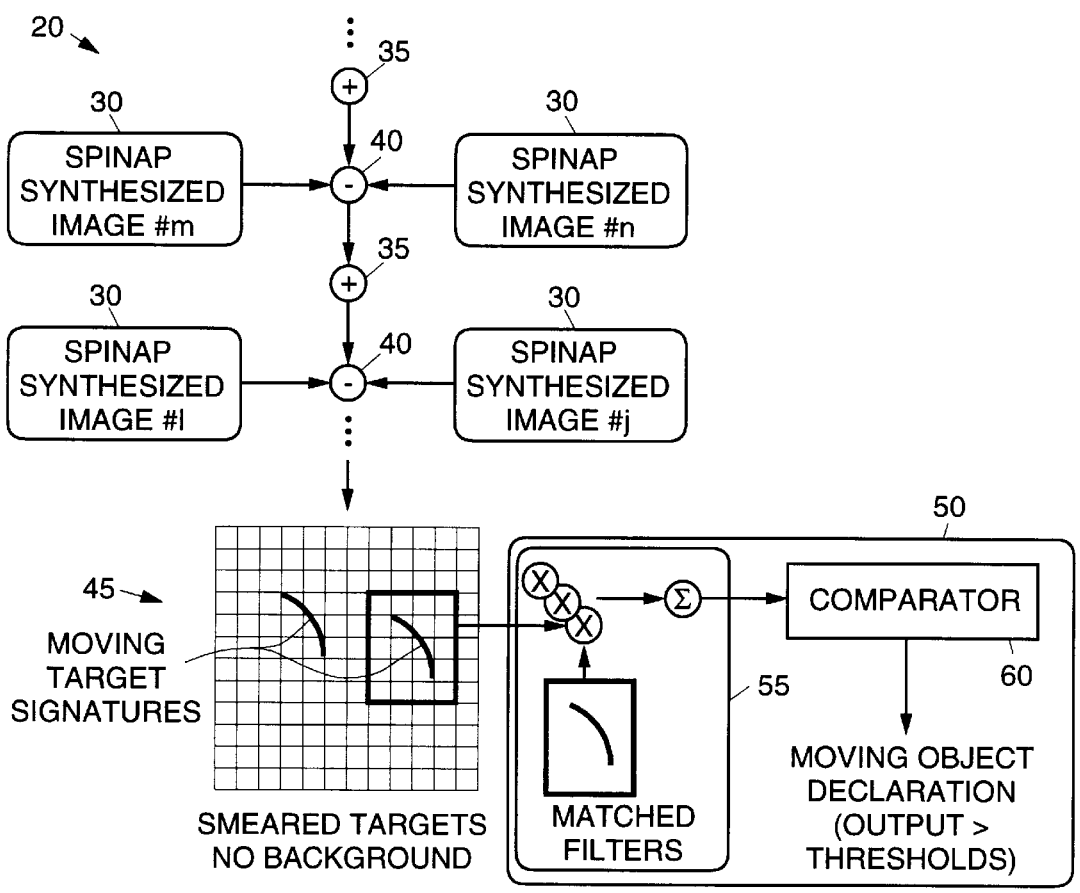
FIG. 2 illustrates a top level embodiment of a SpinAp moving object detection processing method in accordance with the principles of the present invention utilizing a plurality of spatially registered SpinAp synthesized images.

FIG. 2 illustrates a top level diagram of a simple SpinAp moving object detection processing method 20 in accordance with the principles of the present invention employed using an appropriately modified spinning aperture radiometer system and processing methods described in U.S. Pat. No. 5,243,351. The detection method 20 shown in FIG. 2 employs two or more SpinAp strip aperture image sets that observe the same scene to generate equivalent synthesized full circular aperture images 30 of the scene in accordance with U.S. Pat. No. 5,243,351. In the presence of line of sight registration errors, each of the synthesized images 30 are optimally registered spatially by methods described in U.S. Pat. No. 5,243,351.

Any, or all, possible distinct pairs of spatially registered synthesized images 30 are differenced 40 and subsequently added 35 and stored, thereby generating a total sum 45 of differenced synthesized images. If the number of distinct synthesized images 30 is N, then the total number of possible distinct differenced synthesized image pairs is given by N(N–1)/2.

To obtain the best possible detection performance, the resulting sum 45 of differenced synthesized images is transferred to a noise optimal matched filter detection processor 50. The matched filter detection processor 50 incorporates an array of matched filters 55 having properties corresponding to the physical phenomenology of potential objects, such as, shape, size, velocity, acceleration, background to object contrast ratio, signal to noise ratio number of objects, number of track crossings, and the like. The matched filter detection processor 50 also incorporates a priori knowledge of measurement noise statistics propagated through the synthesis and differencing process, as well as, knowledge concerning the unique signal measurement characteristics of the SpinAp sensor system 10. Each of the matched filters 55 of the detection processor 50 is applied to every pixel location of the total sum 45 of differenced synthesized images. The output of each matched filter 55 is transferred to a comparator 60 with thresholds set to a predetermined level of each matched filter 55. A moving object detection is declared when any of the outputs from the matched filters 55 exceed the predetermined thresholds of the comparator 60. The threshold may be predetermined by a priori assumptions concerning the signal and noise statistics, or by a posteriori assumptions concerning the signal and noise statistics based upon the individual frame or set of SpinAp frames.

The differencing operation eliminates all temporally stationary components of the synthesized image, leaving only the signature of smeared synthesized moving objects. The performance of the moving object detection processing method 20 is scenario dependent and is degraded by individual frame measurement noise propagated through the synthesis and differencing operations, and background leakage due to residual frame to frame registration error. If observation parameters permit, acceptable performance may be achieved for less than optimal approaches, whereby the optimal matched filters 55 and the comparator 60 may be replaced by template matched filters and the comparator 60, streak detectors and the comparator 60, or a simple single pixel or multiple pixel threshold exceedence detection processor.

Figure 3:
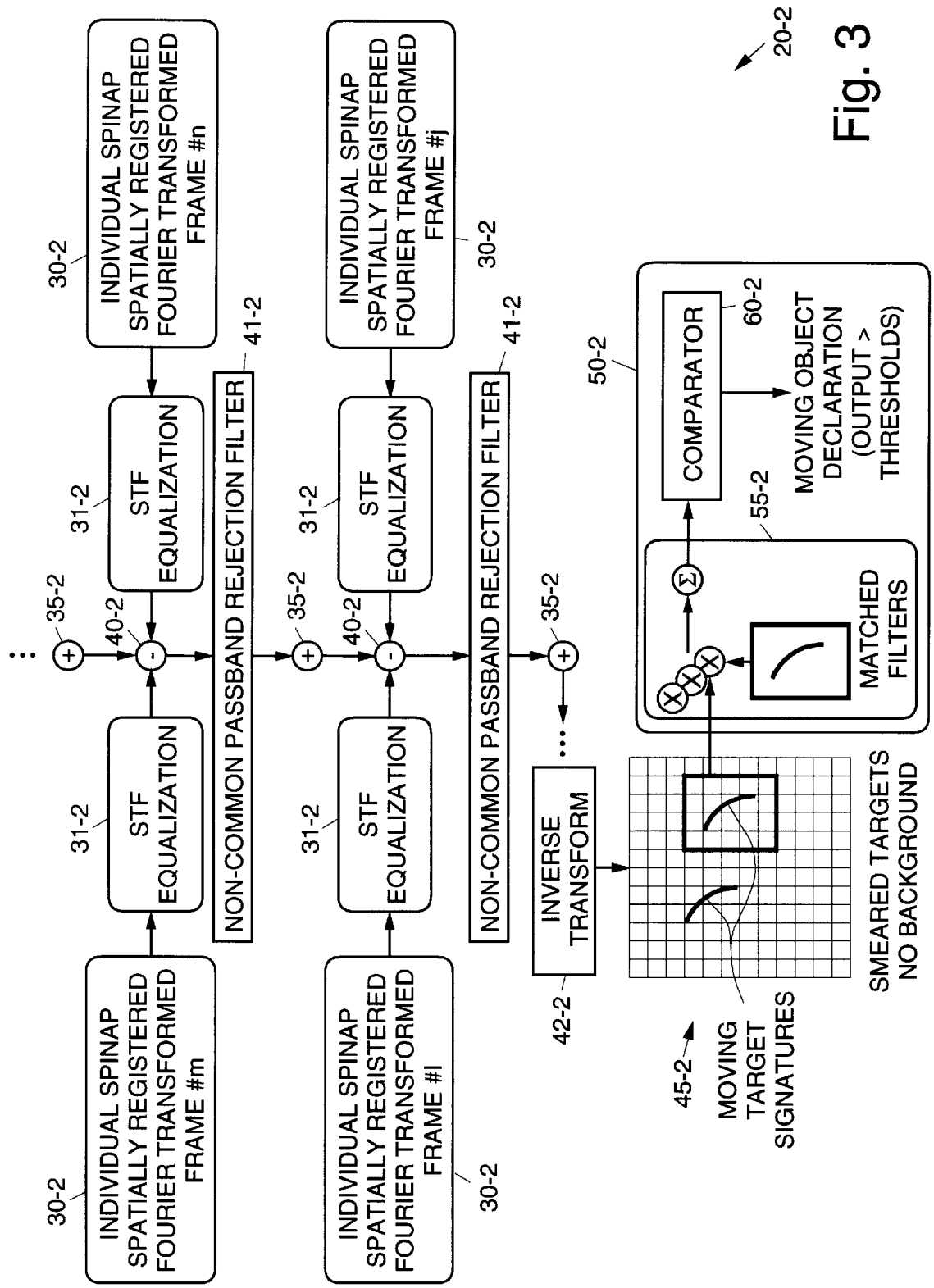
FIG. 3 illustrates a top level embodiment of a SpinAp moving object detection processing method in accordance with the principles of the present invention utilizing a plurality of spatially registered, system transfer function equalized individual SpinAp transformed frames.

FIG. 3 illustrates a top level embodiment of a SpinAp moving object detection processing method 20-2 in accordance with the principles of the present invention employed using an appropriately modified spinning aperture radiometer system and processing methods described in U.S. Pat. No. 5,243,351. The detection method 20-2 shown in FIG. 3 employs two or more SpinAp strip aperture images 30-2 obtained by observing the same scene, and generated using methods described in U.S. Pat. No. 5,243,351. In the presence of line of sight registration errors, each of the individual SpinAp images 30-2 are optimally registered spatially as described in U.S. Pat. No. 5,243,351, and Fourier transformed to a common spatial frequency coordinate system and grid. Typically, the common spatial frequency grid is associated with an equivalent full circular aperture SpinAp synthesized spatial frequency passband.

Any or all possible distinct pairs of spatially registered and Fourier transformed individual frame images 30-2 are multiplied by spatial frequency filters 31-2 designed to compensate for the temporally varying system transfer functions associated with each individual frame and resulting from the rotation of the SpinAp sensor system 10. The system transfer function compensation may be implemented by one of several methods, including: equalizing each frame to a target full circular aperture or other reference system transfer function, equalizing one frame to the system transfer function of the frame to be differenced, or deconvolving the system transfer function from both images to be differenced. For ideal system transfer functions, and if and only if only frames acquired $\pi$ radians apart are to be differenced, no system transfer function equalization is required.

For a template signal detection approach, SpinAp moving object detection methods 20-2 based upon any one of the many possible equalization procedures have unique noise performance characterized by the particular method's receiver operating characteristics (ROC). The differences in ROC for signal template approaches are dominated by different and uncompensated levels of noise "boosting" or "de-boosting" generated by the equalization process. However, an appropriately designed noise optimal matched filter approach compensates for the noise characteristics in the equalization process.

The equalized individual frames are differenced 40-2, and spatial frequency filtered 41-2 to eliminate non-common information outside an overlap passband associated with the two frames. The spatial frequency filtered frame difference is added 35-2 to previous filtered frame differences and stored, thereby generating a total sum 35-2 of differenced spatial frequency filtered Fourier transformed images. If the number of distinct individual frame images is N, then the total number of possible distinct differenced individual frame image pairs contributing to the sum may be as large as $N(N-1)/2$.

To obtain the best possible detection performance, the resulting sum 35-2 of differenced spatial frequency filtered transformed images is inverse Fourier transformed 42-2 to obtain a spatial domain image 45-2, which is transferred to a noise optimal matched filter detection processor 50-2. The matched filter detection processor 50-2 incorporates an array of matched filters 55-2 having properties corresponding to the physical phenomenology of potential objects, such as, shape, size, velocity, acceleration, background to object contrast ratio, signal to noise ratio, number of objects, number of track crossings, and the like. The matched filter detection processor 50-2 also incorporates a priori knowledge of the measurement noise statistics propagated through the equalization, differencing, and filtering process, as well as the unique signal measurement characteristics of the SpinAp sensor system 10. Each of the matched filters 55-2 of the detection processor 50-2 is applied to every pixel location of the total sum 35-2 of differenced filtered images. The output of each matched filter 55-2 is transferred to a comparator 60-2 with thresholds set to a predetermined level for each matched filter 55-2. A moving object detection is declared when any of the outputs from the array of matched filters 55-2 exceed the predetermined thresholds of the comparator 60-2. The threshold may be predetermined by a priori assumptions concerning the signal and noise statistics, or the a posteriori assumptions concerning the signal and noise statistics based upon the individual frame or set of SpinAp frames.

The equalization, differencing, and filtering operations eliminate all temporally stationary components in the common overlap passband of the individual frame images, leaving only the signature of smeared moving objects. The performance of the moving object detection processing method 20-2 is scenario dependent and is degraded by individual frame measurement noise propagated through the equalization, differencing, and filtering operations, and background leakage due to residual frame to frame registration error. If observational parameters permit, acceptable performance may be achieved for less than optimal approaches, whereby the optimal array of matched filters 55-2 and comparator 60-2 may be replaced by template matched filters and the comparator 60-2, streak detectors and the comparator 60-2, or a simple single pixel or multiple pixel threshold exceedence detection processor.

Figure 4:
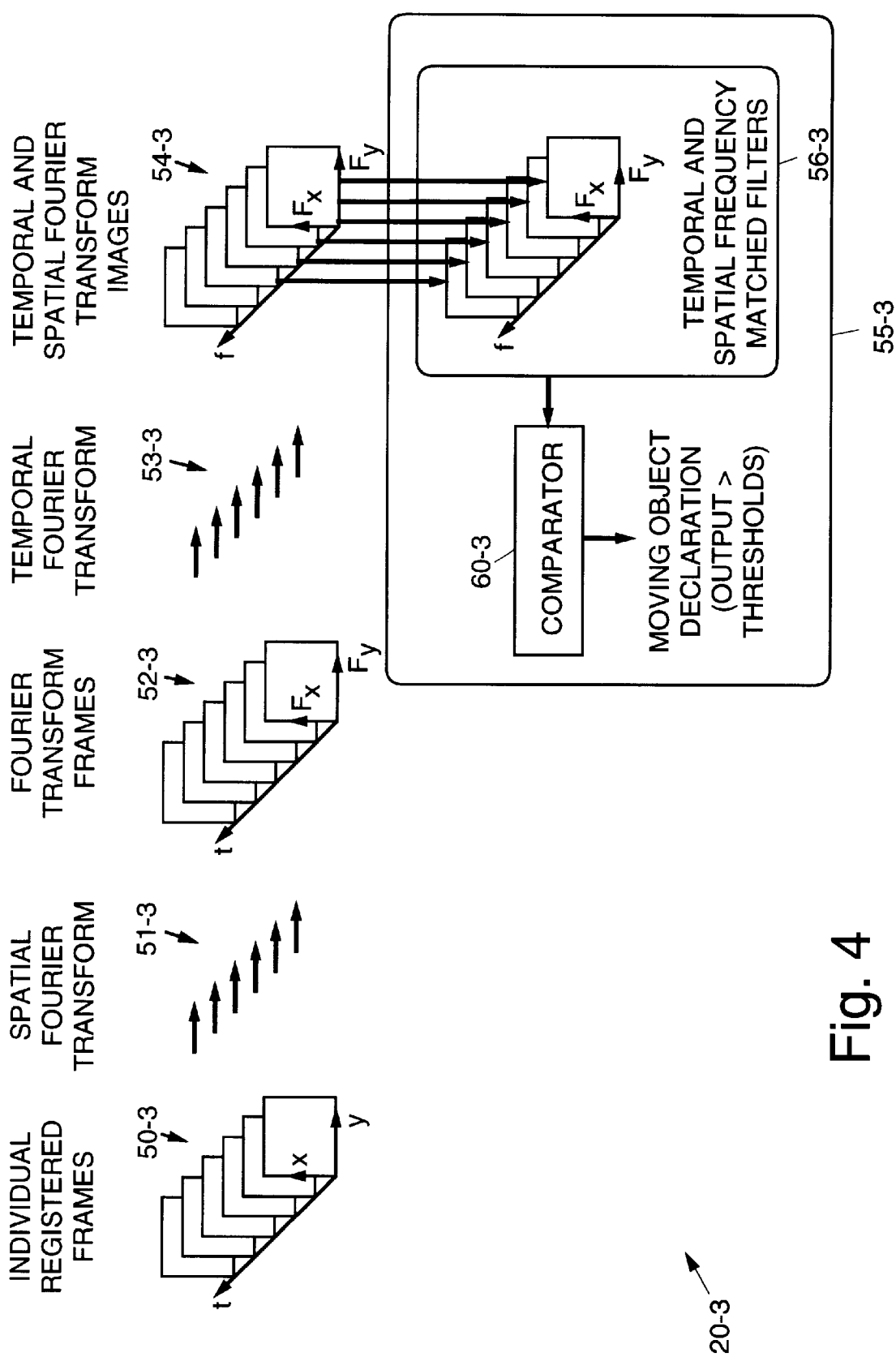
FIG. 4 illustrates a top level embodiment of a SpinAp moving object detection processing method in accordance with the principles of the present invention utilizing a plurality of spatially registered, temporal and spatial frequency transforms of SpinAp individual frame images.

FIG. 4 illustrates a top level embodiment of a SpinAp moving object detection processing method 20-3 in accordance with the principles of the present invention employing an appropriately modified spinning aperture radiometer system and processing methods described in U.S. Pat. No. 5,243,351. The detection method 20-3 shown in FIG. 4 employs a temporal sequence of individual SpinAp strip aperture images 50-3 or sub-images obtained by observing the same scene, generated using methods described in U.S. Pat. No. 5,243,351. In the presence of line of sight registration errors, each of the individual SpinAp images 50-3 are optimally registered spatially by techniques described in U.S. Pat. No. 5,243,351, and Fourier transformed 51-3 to a common spatial frequency coordinate system and grid, thereby producing Fourier transformed images 52-3. Typically, the common spatial frequency grid is associated with an equivalent full circular aperture SpinAp synthesized spatial frequency passband. Any or all possible spatially registered and Fourier transformed individual frame images 52-3 are temporally Fourier transformed 52-3 to produce a data set 54-3 associating all temporal frequencies with each spatial frequency.

To obtain the best possible detection performance, the temporal frequency and spatial frequency transformed data set is transferred to a noise optimal matched filter detection processor 55-3. The matched filter detection processor 55-3 incorporates an array of matched filters 56-3 having properties corresponding to the physical phenomenology of potential objects, such as, shape, size, velocity, acceleration, background to object contrast ratio, signal to noise ratio, number of objects, number of track crossings, and the like. The matched filter detection processor 55-3 also incorporates a priori knowledge of the variation of the system transfer function and other unique measurement characteristics associated with the SpinAp sensor system 10, and the measurement signal and noise statistics propagated through the measurement and transforming processes. Each matched filter 56-3 of the detection processor 55-3 is applied to the set 54-3 of temporally and spatially transformed data. The output of each matched filter 56-3 is transferred to a comparator 60-3 with thresholds set to a predetermined level for each matched filter 56-3. A moving object detection is declared when any of the outputs from the array of matched filters 56-3 exceed the predetermined thresholds of the comparator 60-3. The threshold may be predetermined by a priori assumptions concerning the signal and noise statistics, and/or by a posteriori assumptions concerning the signal and noise statistics based upon the individual frame or set of SpinAp frames.

The temporal frequency matched filter 56-3 implicitly eliminates all temporally stationary components in the individual frame images, leaving only the temporal and spatial frequency signature of smeared moving objects. The performance of the moving object detection processing method 20-3 is scenario dependent and is degraded by individual frame measurement noise propagation, and background leakage due to residual frame to frame registration error. If observational parameters permit, acceptable performance may be achieved for less than optimal approaches, whereby the optimal array of matched filters 56-3 and comparator 60-3 may be replaced by template matched filters and the comparator 60-3, or a simple single frequency "pixel" or multiple frequency "pixel" threshold exceedence detection processor.

Figure 5:
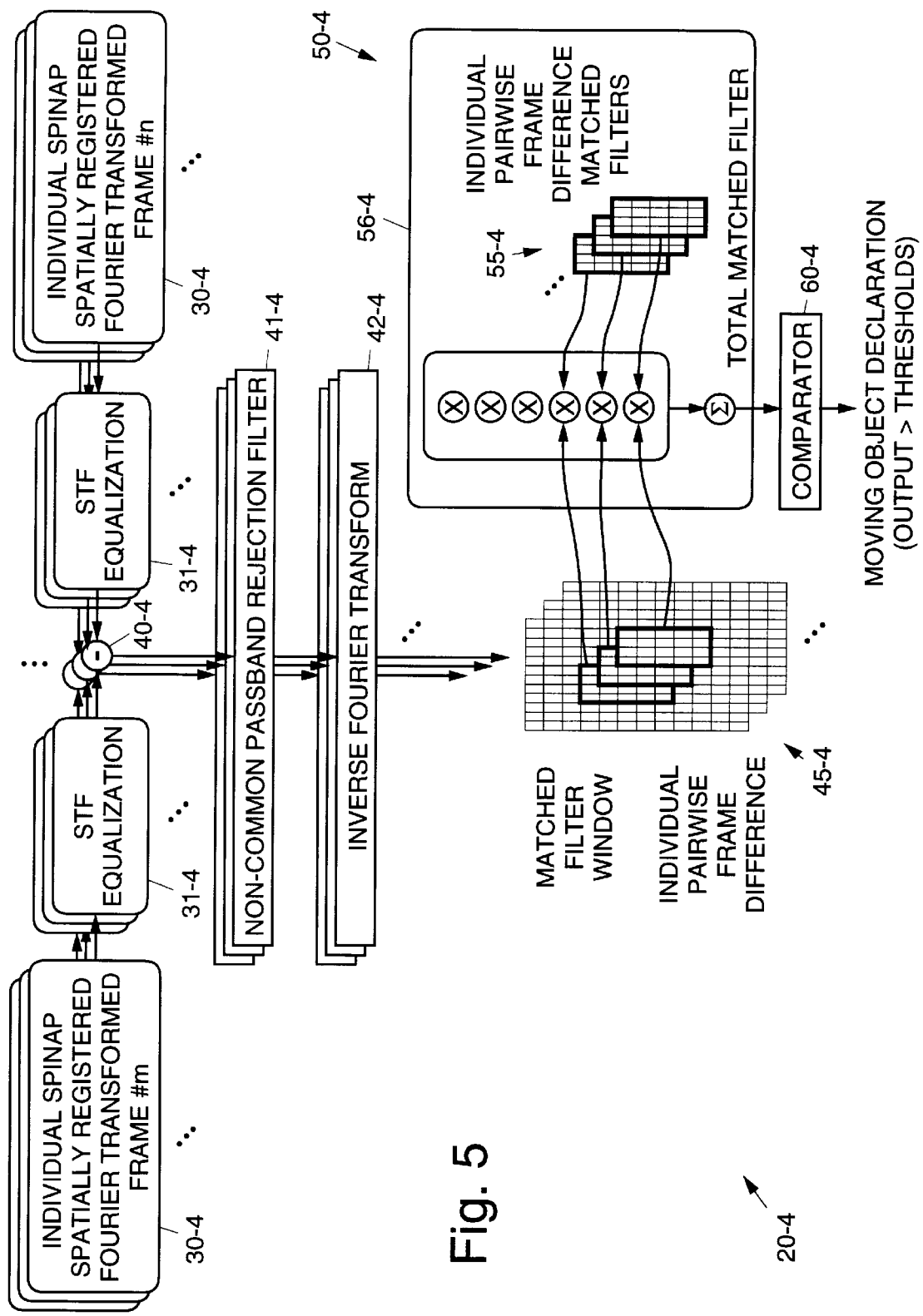
FIG. 5 illustrates a top level embodiment of a SpinAp moving object detection processing method in accordance with the principles of the present invention utilizing a plurality of spatially registered, system transfer function equalized, individual SpinAp transformed frames, and sequential difference frame matched filtering.

FIG. 5 illustrates a top level embodiment of a SpinAp moving object detection processing method 20-4 in accordance with the principles of the present invention employing an appropriately modified spinning aperture radiometer system and processing methods described in U.S. Pat. No. 5,243,351. The detection method 20-4 of FIG. 5 employs two or more SpinAp strip aperture images 30-4 obtained by observing the same scene, generated in accordance with methods described in U.S. Pat. No. 5,243,351. In the presence of line of sight registration errors, each of the individual SpinAp images are optimally registered spatially by methods described in U.S. Pat. No. 5,243,351, and Fourier transformed to a common spatial frequency coordinate system and grid. Typically, the common spatial frequency grid is associated with the equivalent full circular aperture SpinAp synthesized spatial frequency passband.

Any or all possible distinct pairs of spatially registered and Fourier transformed individual frame images 30-4 are multiplied by spatial frequency filters 31-4 designed to compensate for the temporally varying system transfer functions associated with each individual frame and resulting from the rotation of the SpinAp sensor system 10. The system transfer function compensation may be implemented by one of several methods, a few examples of which include: equalizing each frame to a target full circular aperture or other reference system transfer function, equalizing one frame to the system transfer function of the frame to be differenced, or deconvolving the system transfer function from both images 30-4 to be differenced. For ideal system transfer functions, and if and only if only frames acquired a radians apart are to be differenced, no system transfer function equalization is required.

The equalized individual frames are differenced 40-4, and spatial frequency filtered 41-4 to eliminate non-common information outside the overlap passband associated with the two frames. The spatial frequency filtered frame differences are inverse Fourier transformed 42-4 producing individual pairwise differenced images 45-4. If the number of distinct individual frame images is N, then the total number of possible distinct differenced individual frame image pairs can be as large as $N(N-1)/2$.

For a template signal detection approach, SpinAp moving object detection methods 20-4 based upon any one of the many possible equalization procedures have unique noise performance characterized by the particular method's receiver operating characteristics (ROC). The differences in ROC for signal template approaches are dominated by the different and uncompensated levels of noise "boosting" or "de-boosting" generated by the equalization process. However, an appropriately designed noise optimal matched filter approach compensates for the noise characteristics in the equalization process.

To obtain the best possible detection performance, the set of differenced spatial frequency filtered transformed images 45-4 is transferred to a noise optimal matched filter detection processor 50-4. The matched filter detection processor 50-4 incorporates an array of individual pairwise differenced frame matched filters 55-4 having properties corresponding to the physical phenomenology of potential objects, such as, shape, size, velocity, acceleration, background to object contrast ratio, signal to noise ratio, number of objects, number of track crossings, and the like. The matched filter detection processor 50-4 also incorporates a priori knowledge of the measurement noise statistics propagated through the equalization, differencing, and filtering process, as well as unique signal measurement characteristics of the SpinAp sensor system 10. Each of the individual pairwise differenced frame matched filters 55-4 of the detection processor 50-4 is applied to ever pixel location for the appropriate frame difference and subsequently summed. The output of each object phenomenology total matched filter 56-4 is transferred to a comparator 60-4 with thresholds set to a predetermined level for each of the total matched filters 56-4. A moving object detection is declared when any of the outputs from the total matched filter array 55-4 exceed the predetermined thresholds of the comparator 60-4. The threshold may be predetermined by a priori assumptions concerning the signal and noise statistics, or by a posteriori assumptions concerning the signal and noise statistics based upon the individual frame or set of SpinAp frames.

The equalization, differencing, and filtering operations eliminate all temporally stationary components in the common overlap passband of the individual frame images, leaving only the signature of smeared moving objects. The performance of the moving object detection method 20-4 is scenario dependent and is degraded by individual frame measurement noise propagated through the equalization, differencing, and filtering operations, and background leakage due to residual frame to frame registration error. If observational parameters permit, acceptable performance may be achieved for less than optimal approaches, whereby the optimal array of matched filters 56-4 and comparator 60-4 may be replaced by template matched filters and the comparator 60-4, streak detectors and the comparator 60-4, or a simple single pixel or multiple pixel threshold exceedence detection processor.

For the purposes of completeness, the formulation of the SpinAp moving object detection processing method 20 is as follows. Using the definitions and nomenclature in U.S. Pat. No. 5,243,351, a description of the mathematical foundations of the enhanced moving object detection SpinAp sensor 10 and data processing methods 20, 20-2, 20-3, 20-4 embodied in the present invention.

Individual SpinAp noise free measurements will first be discussed. In the absence of noise, the mean number of detection electrons produced during the integration time of a detector located at position $\bar{R}$ acquired during frame time $t_j$ may be expressed as, $$O_s(\bar{R},t_j) = \int d^2\bar{F} \hat{O}_s(\bar{F},t_j) \exp\{-2\pi i \bar{F} \cdot \bar{R}\}$$

where $O_s(\bar{F},t_j)$ is the spatial Fourier transform of the detector output at spatial frequency $\bar{F}$ and frame time $t_j$. Assuming the effective sensor system transfer function is temporally stationary during the detectors integration time $\Delta T$, the Fourier transform of the individual frames detected intensity may be expressed as $$\hat{O}_s(\bar{F}, t_j) = \bar{I}_{AS} \hat{W}_0 A_{fpaS} STF(\bar{F}, t_j) \left\{ \frac{1}{\Delta T} \int_{t_j - \frac{\Delta T}{2}}^{t_j + \frac{\Delta T}{2}} dt \hat{S}_n(M\bar{F}, t) \right\},$$

where $\bar{I}_{AS}$ is the intensity spatially averaged over the effective focal plane array area, $\hat{W}_0$ is the zero spatial frequency component of the detector transfer function, $A_{fpaS}$ is the effective focal plane array area, STF $(\bar{F},t_j)$ is the total sensor system transfer function correspond to frame time $t_j$, and $\hat{S}_n(M\bar{F},t)$ is the normalized spatial Fourier transform of the geometrical projection of the scene at time t.

A mathematical representation of a scene and the scene's geometrical projection to the imaging plane, including background, a single moving object, and scattering component will now be discussed. The intensity emitted from a scene containing a single object moving in front (relative to the SpinAp sensor) of a background, and behind transmissive scattering layers may be expressed as, $$S(\bar{r},t) = T(\bar{r},t) + B(\bar{r},t) - B(\bar{r},t)W_T W_T(\bar{r},t) + H(\bar{r},t),$$

where $T(\bar{r},t)$ is the intensity distribution of the moving object at scene position $\bar{r}$ and time t, $B(\bar{r},t)$ is the intensity distribution of the background at scene position $\bar{r}$ and time t, $H(\bar{r},t)$ is the intensity distribution of transmissive scattering layers corresponding to scene position $\bar{r}$ and time t, and $W_T(\bar{r},t)$ is the object's inverse silhouette at scene position $\bar{r}$ and time t. The object's inverse silhouette is given by $$W_T(\bar{r},t) = \{1 \text{ if } T(\bar{r},t) > 0 \text{ and } 0 \text{ otherwise}.$$

Subtracting $B(\bar{r},t)W_t(\bar{r},t)$ in the equation for $S(\bar{r},t)$ corresponds to removing the background photons obscured by the moving object at scene position $\bar{r}$ and time t.

Therefore, the geometrical projection of the scene's intensity to the focal plane of the SpinAp optical system is represented by $$I_g(\bar{R}) = \frac{1}{M^2} S(\bar{R}/M, t) =$$
$$\frac{1}{M^2}[T(\bar{R}/M, t) + B(\bar{R}/M, t) - B(\bar{R}/M, t)W_T(\bar{R}/M, t) + H(\bar{R}/M, t)]$$

where M is the magnification of the optical system. Fourier transforming the geometrical projection and applying the Fourier transform similarity theorem yields, $$I_g(\bar{F}) \equiv FT[I_g\{\bar{R}\}] = FT\left\{\frac{1}{M^2} S(\bar{R}/M, t)\right\} = S(M\bar{F}, t)$$

or $$I_g(\bar{F}) = \frac{1}{M^2}\{FT\{T(\bar{R}/M, t)\} + FT\{B(\bar{R}/M, t)\} + FT\{H(\bar{R}/M, t)\} - FT\{B(\bar{R}/M, t)W_T(\bar{R}/M, t)\}\}$$

where FT and ^ refer to the Fourier transform operation. Application of the Fourier transform convolution theorem, and transforming variables permits the evaluation of $FT\{B(\bar{R}/M,t)W_T(\bar{R}/M,t)\}/M^2$ yielding, $$\frac{1}{M^2} FT\{B(\bar{R}/M, t)W_T(\bar{R}/M, t)\} = M^2 \int d^2\bar{F}' \hat{B}(M[\bar{F} - \bar{F}'], t) \hat{W}_T(M\bar{F}', t).$$

The corresponding geometrical projection of the scene spectrum and its zero spatial frequency component are given by $$I_g(\bar{F}) = \hat{T}(M\bar{F}, t) + \hat{H}(M\bar{F}, t) +$$
$$\hat{B}(M\bar{F}, t) - M^2 \int d^2\bar{F}' \hat{B}(M[\bar{F} - \bar{F}'], t) \hat{W}_T(M\bar{F}', t)$$

and $$I_g(\bar{F} = 0) = \hat{T}(M\bar{F} = 0, t) + \hat{H}(M\bar{F} = 0, t) +$$
$$\hat{B}(M\bar{F} = 0, t) - M^2 \int d^2\bar{F}' \hat{B}(-M\bar{F}', t) W_T(M\bar{F}', t).$$

The instantaneous normalized geometrically projected scene spectrum is represented as $$S_n(M\bar{F}, t) = \frac{I_g(\bar{F})}{I_g(\bar{F} = 0)} =$$

$$\frac{\hat{S}(M\bar{F})}{\hat{S}(M\bar{F} = 0)} = \frac{\hat{T}(M\bar{F}, t) + \hat{H}(M\bar{F}, t) + \hat{B}(M\bar{F}, t) - M^2 \int d^2\bar{F}' \hat{B}(M[\bar{F} - \bar{F}'], t) \hat{W}_T(M\bar{F}', t)}{\hat{T}(M\bar{F} = 0, t) + \hat{H}(M\bar{F} = 0, t) + \hat{B}(M\bar{F} = 0, t) - M^2 \int d^2\bar{F}' \hat{B}(-M\bar{F}', t) \hat{W}_T(M\bar{F}', t)}.$$

The normalized scene spectrum can be decomposed into two components dominated by the background and foreground spectrum, and the moving objects contribution to the spectrum, such a representation is $$S_n(M\bar{F},t) \equiv \hat{B}_n(M\bar{F},t) + \Delta\hat{T}_n(M\bar{F},t)$$

where $$\hat{B}_n(M\bar{F},t) \equiv \frac{\hat{H}(M\bar{F},t) + \hat{B}(M\bar{F},t)}{\left[\hat{H}(M\bar{F}=0,t) + \hat{B}(M\bar{F}=0,t)\right]}$$
$$\left\{1 + \frac{\hat{T}(M\bar{F}=0,t) - M^2 \int d^2 \bar{F}' \hat{B}(-\bar{F}'M,t)\hat{W}_T(\bar{F}'M,t)}{\hat{H}(M\bar{F}=0,t) + \hat{B}(M\bar{F}=0,t)}\right\}$$

$\hat{B}_n(M\bar{F},t)$ is the normalized background and foreground component for spatial frequency $M\bar{F}$ at time t, and $$\Delta\hat{T}(M\bar{F},t) = \frac{\hat{T}(M\bar{F},t) - M^2 \int d^2 \bar{F}' \hat{B}([\bar{F}-\bar{F}']M,t)\hat{W}_T(\bar{F}'M,t)}{\left[\hat{H}(M\bar{F}=0,t) + \hat{B}(M\bar{F}=0,t)\right]}$$
$$\left\{1 + \frac{\hat{T}(M\bar{F}=0,t) - M^2 \int d^2 \bar{F}' \hat{B}(-\bar{F}'M,t)\hat{W}_T(\bar{F}'M,t)}{\hat{H}(M\bar{F}=0,t) + \hat{B}(M\bar{F}=0,t)}\right\}$$

where $\Delta\hat{T}_n(M\bar{F},t)$ is the normalized object's variation from the background and foreground for spatial frequency $\bar{F}$ at time t.

Normalized background and foreground spectra for a temporally stationary scenes will now be discussed. For observational scenarios having temporally stationary total background components, the normalized total background spectrum, and moving object variation are $$\hat{B}_n(M\bar{F},t) \equiv \frac{\hat{H}(M\bar{F},t) + \hat{B}(M\bar{F},t)}{\left[\hat{H}(M\bar{F}=0,t) + \hat{B}(M\bar{F}=0,t)\right]}$$
$$\left\{1 + \frac{\hat{T}(M\bar{F}=0,t) - M^2 \int d^2 \bar{F}' \hat{B}(-\bar{F}'M,t)\hat{W}_T(\bar{F}'M,t)}{\hat{H}(M\bar{F}=0,t) + \hat{B}(M\bar{F}=0,t)}\right\}$$

and $$\Delta\hat{T}_n(M\bar{F},t) \equiv \frac{\hat{T}(M\bar{F},t) - M^2 \int d^2 \bar{F}' \hat{B}([M(\bar{F}-\bar{F}')])\hat{W}_T(\bar{F}'M,t)}{\left[\hat{H}(M\bar{F}=0) + \hat{B}(M\bar{F}=0)\right]}$$
$$\left\{1 + \frac{\hat{T}(M\bar{F}=0,t) - M^2 \int d^2 \bar{F}' \hat{B}(-\bar{F}'M)\hat{W}_T(\bar{F}'M,t)}{\hat{H}(M\bar{F}=0) + \hat{B}(M\bar{F}=0)}\right\}$$

Moving object and background decoupling will now be discussed. If the number of background photons obscured by the moving object is negligible when compared to the total number of background photons, then the total background and moving object variation normalized spectra can be further simplified, yielding $$\hat{B}_n(M\bar{F},t) \equiv \hat{B}_n(M\bar{F}) \approx \frac{\hat{H}(M\bar{F}) + \hat{B}(M\bar{F})}{\hat{H}(M\bar{F}=0) + \hat{B}(M\bar{F}=0)},$$

and $\Delta\hat{T}_n$ is given by $$\Delta\hat{T}_n(M\bar{F},t) \approx \frac{\hat{T}(M\bar{F},t) - M^2 \int d^2 \bar{F}' \hat{B}([M\bar{F}-\bar{F}'])\hat{W}_T(\bar{F}'M,t)}{\left[\hat{H}(M\bar{F}=0) + \hat{B}(M\bar{F}=0)\right]}.$$

Temporal variation of the object and the object's inverse silhouette will now be discussed. The time dependent motion of the object may be describe by applying a temporal dependent spatial shift to the argument of the objects spatial intensity distribution. Defining the starting time of the imaging process to be $t_0$, the initial object and the object inverse silhouette are given by $$T_0(\bar{r}) = T(\bar{r},t_0)$$

$$W_{T0}(\bar{r}) = W_T(\bar{r},t_0).$$

The motion dependent temporal variations of the object and the object silhouette are given by $$T(\bar{r},t) = T_0(\bar{r}-\bar{r}_T(t))$$

$$W_T(\bar{r},t) = W_{T0}(\bar{r}-\bar{r}_T(t)),$$

where $+\bar{r}_T(t)$ is the vectorial position of the object in the scene coordinates as a function of time, referred to as object track.

Moving object and inverse silhouette spectra will now be discussed. Applying the Fourier transform shift theorem to the moving object and moving object inverse silhouette produces the corresponding spectra, given by $$\hat{T}(M\bar{F},t) = \hat{T}(M\bar{F},t_0)\exp(-2\pi i M\bar{F}\cdot\bar{r}_T(t)) \equiv \hat{T}_0(M\bar{F})\exp(-2\pi i\bar{F}\cdot R_T(t))$$

and $$\hat{W}_T(M\bar{F},t) = \hat{W}_T(M\bar{F},t_0)\exp(-2\pi i M\bar{F}\cdot\bar{r}_T(t)) \equiv \hat{W}_{T0}(M\bar{F})\exp(-2\pi i\bar{F}\cdot R_T(t))$$

respectively.

Moving object variation from background with explicit dependence on the object track will now be discussed. Substituting the above equations for $\hat{T}(M\bar{F},t)$ and $\hat{W}_T(M\bar{F},t)$ into the expression for the object spectrum variation $\Delta\bar{T}_N$, yields $$\Delta\hat{T}_n([M(\bar{F}-\bar{F}')]) \approx$$

$$\frac{\hat{T}_0(M\bar{F})\exp(-2\pi i\bar{F}\cdot R_T(t)) - M^2 \int d^2 \bar{F}' \hat{B}([M(\bar{F}-\bar{F}')])\hat{W}_{T0}(\bar{F}'M)\exp(-2\pi i\bar{F}\cdot R_T(t))}{\left[\hat{H}(M\bar{F}=0) + \hat{B}(M\bar{F}=0)\right]}$$

For constant velocity motion during the detector integration time, the object's vectorial position can be represented $\bar{R}_T(t) = \bar{V}t$, where $\bar{V}$ is the velocity component of the moving object. Therefore, the normalized object spectral variation, $\Delta\hat{T}_n$, $$\Delta\hat{T}_n(M\bar{F},t) \approx \frac{\hat{T}_0(M\bar{F})\exp\left|-2\pi i\bar{F}\cdot\bar{V}(t)\right) - M^2 \int d^2 \bar{F}' \hat{B}(M[\bar{F}-\bar{F}'])\hat{W}_{T0}(M\bar{F}')\exp(-2\pi i\bar{F}\cdot\bar{V}(t))}{\left[\hat{H}(M\bar{F}=0) + \hat{B}(M\bar{F}=0)\right]}.$$

Time average individual SpinAp frame spectra will now be discussed. Since the mean detector measurement results from a temporal average of the imaged moving object and total background, the time averaged Fourier spectrum of the measurement assuming the system transfer function is constant during the detector integration time is $$\hat{O}_s(\overline{F}, t_j) =$$

$$\overline{I}_{AS}\hat{W}_0 A_{fpaS} STF(\overline{F}, t_j) \left\{ \hat{B}_N(M\overline{F}) + \frac{1}{\Delta T} \int_{t_j-\frac{\Delta T}{2}}^{t_j+\frac{\Delta T}{2}} dt \Delta \hat{T}_n(M\overline{F}, t) \right\} =$$

$$\overline{I}_{AS}\hat{W}_0 A_{fpaS} STF(\overline{F}; t_j) \hat{B}_N(M\overline{F}) +$$

$$\overline{I}_{AS}\hat{W}_0 A_{fpaS} STF(\overline{F}; t_j) \cdot \frac{\hat{T}_0(M\overline{F})}{[\hat{H}(M\overline{F}=0) + \hat{B}(M\overline{F}=0)]}$$

$$\frac{\sin(\pi \overline{F} \cdot \overline{V}\Delta T)}{\pi \overline{F} \cdot \overline{V}\Delta T} e^{(-2\pi i \overline{F} \cdot \overline{V} t_j)} - \overline{I}_{AS}\hat{W}_0 A_{fpaS} STF(\overline{F}, t_j) \cdot M^2$$

$$\int d^2 \overline{F} \frac{\hat{B}(M[\overline{F}-\overline{F}'])\hat{W}_{T0}(M\overline{F}')\sin(\pi \overline{F}' \cdot \overline{V}\Delta T)}{[\hat{H}(M\overline{F}=0) + \hat{B}(M\overline{F}=0)]\pi \overline{F}' \cdot \overline{V}\Delta T} e^{(-2\pi i \overline{F} \cdot \overline{V} t_j)}.$$

where the time average of the constant velocity motion required integration of the 'track' integral $$\frac{1}{\Delta T}\int_{t_j-\frac{\Delta T}{2}}^{t_j+\frac{\Delta T}{2}} dt \exp 2\pi i \overline{F}' \cdot \overline{V} T =$$

$$\frac{\exp(-2\pi i \overline{F} \cdot \overline{V} t)}{\exp(-2\pi i \overline{F} \cdot \overline{V})}\bigg|_{t_j-\frac{\Delta T}{2}}^{t_j+\frac{\Delta T}{2}} = \exp(2\pi i \overline{F} \cdot \overline{V} t_j) \frac{\sin(\pi \overline{F} \cdot \overline{V}\Delta T)}{\pi \overline{F} \cdot \overline{V}\Delta T}.$$

The SpinAp synthesizer and synthesizing process will now be discussed. The simplest version of the SpinAp synthesizing process employs a synthesizer, such that the spatial frequency redundancy average of the noise free measurements yield the equivalent full circular aperture image, or $$\hat{O}_{F\,syn}(\overline{F}) = \hat{\Lambda}(\overline{F})\hat{O}_{S\,ave}(\overline{F})$$

where $\hat{O}_{F\,syn}(\overline{F})$ is the full circular aperture image to be synthesized, $\hat{\Lambda}(\overline{F})$ is the synthesizer, and where $\hat{O}_{S\,ave}(\overline{F})$ is the spatial frequency redundancy average of the (noise free) individual frame measurement spectra.

$$\hat{O}_{S\,ave}(\overline{F}) = \frac{1}{N_{rf}(\overline{F})} \sum_{j=1}^{N_{rf}(\overline{F})} \hat{O}_S(\overline{F}, t_j).$$

The synthesizer, $\Lambda$, is given by $$\Lambda(\overline{F}) = \frac{\overline{I_{AF} A_{fpaF} \hat{W}_{0F} \hat{W}_{NF}(\overline{F}) OTF_F(\overline{F})}}{\overline{I_{AS} A_{fpaS} \hat{W}_{0S} \hat{W}_{NS} OTF_S(\overline{F})}} = \frac{\overline{I_{AF} A_{fpaF} \hat{W}_{0F} STF_F(\overline{F})}}{\overline{I_{AS} A_{fpaS} \hat{W}_{0S} STF_F(\overline{F})}},$$

for $\hat{W}_{NS} OTF_S(\overline{F}) = STF_S(\overline{F}) \neq 0$, where STF corresponds to the system transfer function, which is the product of the optical system transfer function, OTF, the normalized detector transfer function $\hat{W}_N$, and the subscripts S and F designate parameters associated with the SpinAp strip aperture sensor and the target full circular aperture system, respectively. The spatial frequency redundancy averaged strip aperture transfer function appearing in the denominator of the synthesizer is $$\overline{\hat{W}_{NS} OTF_S(\overline{F})} =$$

$$\overline{STF_S(\overline{F})} = \frac{1}{N_{rf}(\overline{F})} \sum_{j=1}^{N_{rf}(\overline{F})} \hat{W}_{NS}(\overline{F}, t_j) OTF_S(\overline{F}, t_j) = \sum_{j=1}^{N_{rf}(\overline{F})} \frac{STF_S(\overline{F}, t_j)}{N_{rf}(\overline{F})}.$$

Therefore, the synthesized image spectrum resulting from the observation of a scene consisting of a temporally stationary total background and foreground, and an object moving in the sensors field of view is given by $$\hat{O}_{Fsyn}(\overline{F}) = \hat{\Lambda}(\overline{F}) \frac{1}{N_{rf}(\overline{F})} \sum_{j=1}^{N_{rf}(\overline{F})} O_S(\overline{F}, t_j)$$

$$= \hat{\Lambda}(\overline{F}) \frac{1}{N_{rf}(\overline{F})} \sum_{j=1}^{N_{rf}(\overline{F})} \overline{I}_{AS} \hat{W}_0 A_{fpaS} STF(\overline{F}, t_j) \hat{B}_N(M\overline{F}) +$$

$$\hat{\Lambda}(\overline{F}) \frac{1}{N_{rf}(\overline{F})} \sum_{j=1}^{N_{rf}(\overline{F})} \overline{I}_{AS} \hat{W}_0 A_{fpaS} STF(\overline{F}, t_j) \frac{\hat{T}_0(M\overline{F})}{\hat{H}(M\overline{F}=0) + \hat{B}(M\overline{F}=0)} \cdot$$

$$\frac{\sin(\pi \overline{F}' \cdot \overline{V}\Delta T)}{\pi \overline{F}' \cdot \overline{V}\Delta T} \exp(-2\pi i \overline{F}' \cdot \overline{V}_j(t_j)) +$$

$$\hat{\Lambda}(\overline{F}) \frac{1}{N_{rf}(\overline{F})} \sum_{j=1}^{N_{rf}(\overline{F})} \overline{I}_{AS} \hat{W}_0 A_{fpaS} STF(\overline{F}, t_j) M^2 \cdot$$

$$\int d^2 \overline{F}' \frac{\hat{B}(M[\overline{F}-\overline{F}'])\hat{W}_{T0}(M\overline{F}')\sin(\pi \overline{F}' \cdot \overline{V}_j \Delta T)}{\hat{H}(M\overline{F}=0) + \hat{B}(M\overline{F}=0)\pi \overline{F}' \cdot \overline{V}_j \Delta T} \exp(-2\pi i \overline{F}' \cdot \overline{V}_j(t_j));$$

Further simplification produces, $$\hat{O}_{Fsyn}(\overline{F}) = \overline{I}_{AF} \hat{W}_{OF} A_{fpaF} \, STF_F(\overline{F}) \hat{B}_N(M\overline{F}) +$$

$$\overline{I}_{AF} \hat{W}_{OF} A_{fpaF} \frac{STF_F(\overline{F})}{\sum_{j=1}^{N_{rf}(F)} STF_S(\overline{F}, t_j)} \frac{\hat{T}_0(M\overline{F})}{\hat{H}(M\overline{F}=0) + \hat{B}(M\overline{F}=0)} \cdot$$

$$\sum_{j=1}^{N_{rf}(F)} STF_S(\overline{F}, t_j) \frac{\sin(\pi \overline{F} \cdot \overline{V}_j \Delta T)}{\pi \overline{F} \cdot \overline{V}_j \Delta T} \exp(-2\pi i \overline{F} \cdot \overline{V}_j(t_j)) +$$

$$\frac{\overline{I}_{AF} \hat{W}_{OF} A_{fpaF} STF_F(\overline{F})}{\sum_{j=1}^{N_{rf}(F)} STF_S(\overline{F}, t_j)} \sum_{j=1}^{N_{rf}(F)} STF_S(\overline{F}, t_j) \cdot$$

$$M^2 \int d^2 \overline{F}' \frac{\hat{B}(M[\overline{F} - \overline{F}'])\hat{W}_{TO}(M\overline{F}')\sin(\pi \overline{F}' \cdot \overline{V}_j \Delta T)}{\hat{H}(M\overline{F}=0) + \hat{B}(M\overline{F}=0)\pi \overline{F}' \cdot \overline{V}_j \Delta T} \exp(-2\pi i \overline{F}' \cdot \overline{V}_j(t_j));$$

20

The first term in the synthesized image spectrum equation corresponds to the equivalent fall circular aperture image of the temporally stationary background. The next two terms in the equation correspond to the moving object's signature in the synthesized image.

Differenced synthesized images and moving object signatures will now be discussed. A moving object spatial frequency domain signature may be obtained by differencing two or more synthesized image spectra. Differencing two completely independent, full aperture synthesized images (or image spectra), while observing the same scene, requires a minimum of two 180 degree rotations. Alternatively, to decrease the time between frame differences, synthesized images (or spectra) may be differenced with as few as one non-common frame, or the synthesis operation may be performed with fewer than the required number of frames to generate the full circular passband image spectra.

Since the temporally stationary parts of the synthesized images are identical for any pair of synthesized images observing the same scene, the difference of synthesized images will contain only moving object information. The noise free spatial frequency domain moving object signature of the differenced synthesized images is given by $$\Delta \hat{O}_{BA}(\overline{F}) = \hat{O}_{synB}(\overline{F}) - \hat{O}_{synA}(\overline{F})$$

$$= \frac{\overline{I}_{AF} \hat{W}_{OF} A_{fpaF} STF_F(\overline{F})}{\sum_{j=1}^{N_{rf}(F)} STF_S(\overline{F}, t_j)} \frac{\hat{T}_0(M\overline{F})}{\hat{H}(M\overline{F}=0) + \hat{B}(M\overline{F}=0)} \cdot$$

$$\left\{ \sum_{j=1}^{N_{rf}(F)} STF_S(\overline{F}, t_j) \frac{\sin(\pi \overline{F} \cdot \overline{V}_j \Delta T)}{\pi \overline{F} \cdot \overline{V}_j \Delta T} \exp(-2\pi i \overline{F}' \cdot \overline{V}_j(t_j)) + \right.$$

$$\sum_{k=1}^{N_{rf}(F)} STF_S(\overline{F}, t_j) M^2 \int d^2 \overline{F}' \frac{\hat{B}(M[\overline{F} - \overline{F}'])\hat{W}_{TO}(M\overline{F})}{\hat{H}(M\overline{F}=0) + \hat{B}(M\overline{F}=0)} \cdot$$

$$\left. \frac{\sin(\pi \overline{F}' \cdot \overline{V}_k \Delta T)}{\pi \overline{F}' \cdot \overline{V}_k \Delta T} \exp(-2\pi i \overline{F}' \cdot \overline{V}_k(t_k)) \right\}.$$

The spatial signature of the moving object resulting from the difference of synthesized images is $$\Delta \hat{O}_{BA}(R, \delta T) = \int d^2 F \Delta \hat{O}_{BA}(\overline{F}) \exp(2\pi i \overline{F} \cdot \overline{R}),$$

where $\delta T$ represents the time delay associated with the acquisition of different sets of acquired strip aperture frames.

Differencing any pair of appropriately modified SpinAp frames for background removal and moving object detection will now be discussed. For $2N_f$ individual SpinAp strip aperture frames, there are $2N_f(2N_f-1)/2$ possible distinct pairwise frame comparisons, or differences. An optimal detection technique would take advantage of the background removal when differencing any possible pair, as well as, the potentially large number of moving object pairwise signatures. However, unlike differencing frames for the purposes of background removal and moving object detection for temporally stationary aperture systems, specific techniques and methods must be applied to the SpinAp data sets to compensate for the rotating nature of the system transfer function. The SpinAp data sets are modified to distinguish between temporal variations in the scene and temporal variations originating from the moving object.

SpinAp individual noisy frame measurements and frame to frame system transfer function equalization will now be discussed. The individual strip aperture noisy measurements spectra can be represented as the noise free strip aperture detected image spectra plus the strip aperture additive noise spectra $$\hat{O}_{Sm}(F, t_j) = \hat{O}_S(F, t_j) + \hat{n}_s(F, t_j),$$

where $\hat{O}_S$ and $\hat{n}_s$ are the noise free signal and noise spectra, respectively.

Individual frame system transfer function passband filter will now be discussed. In general, the individual frame measurements provide information related to different portions of the equivalent full circular aperture optical system passband. The detection of temporally nonstationary phenomenology, such as, moving objects or transient events requires the identification and utilization of common information between frames, as well as, accommodating for the differences in image contrast due to the time varying nature of the SpinAp sensor's transfer function. The frame to frame system transfer function compensation can be implemented by several methods, a few examples of which are equalizing each frame to a target full circular aperture or other reference system transfer function; equalizing one frame to the system transfer function of the frame to be differenced; deconvolving the system transfer function from both images to be differenced; or for ideal system transfer functions, and if only frames acquired π radians apart are to be differenced, no system transfer function equalization is required.

For a template signal detection approach the SpinAp moving object detection methods based upon any one of the many possible equalization procedures would have unique noise performance characterized by the particular method's receiver operating characteristics (ROC). The differences in ROC for signal template approaches are dominated by the different and uncompensated levels of noise "boosting" or "de-boosting" generated by the equalization process. However, an appropriately designed noise optimal matched filter approach would compensate for the noise characteristics in the equalization process.

While any one of many methods can be used to implement the system transfer function equalization, the formulation described in the following paragraphs is typical of the mathematical details associated with each procedure. For brevity, only the procedure whereby one frame is equalized to another is described in detail.

Selecting one frame as the current reference frame and any different second frame to be used in the comparison, the spectra of the frames are spatial frequency filtered to provide spatial frequency information in the common overlap region of the passbands of both frames. The second frame is also modified to compensate for the differences in system transfer function, i.e.

$$\hat{m}_R(F,t_i) = \hat{\chi}(F,t_j)\hat{\chi}(F,t_i)\hat{O}_{Sm}(F,t_i) = \hat{\chi}(F,t_i)\hat{\chi}(F,t_j)[\hat{O}_S(F,t_j) + \hat{n}_s(F,t_j)],$$

and $$\hat{m}_E(F,t_i) = \hat{\chi}(F,t_j)\hat{\chi}(F,t_i)\hat{O}_{Sm}(F,t_i)\hat{H}(F,t_j,t_i) = \hat{\chi}(F,t_i)\hat{\chi}(F,t_j)[\hat{O}_S(F,t_j) + \hat{n}_s(F,t_j)]\hat{H}(F,t_j,t_i),$$

where $\hat{m}_R(F,t_i)$ denotes the spatial frequency filtered output of the reference frame, and $\hat{m}_E(F,t_i)$ the spatial frequency filtered and transfer function equalized output of the frame to be compared, $\chi$ is the optical system passband filter, $$\hat{\chi}(F,t_j) = 1 \text{ if } STF_s(F,t_j) > 0, \text{ and 0 otherwise}$$

and $\hat{H}$ is the noise free passband equalization filter $$\hat{H}(F,t_j,t_i) = 1 \text{ if } \frac{STF_s(F,t_i)}{STF_s(F,t_j)} > 0, \text{ and 0 otherwise.}$$

The filtered and equalized difference between any two frames can be expressed as the sum of differenced signal and noise spectra, i.e.

$$\Delta\hat{m}_{ij}(\overline{F}) = \hat{m}_R(F,t_i) - \hat{m}_E(F,t_j) = \widehat{\Delta S}_{ij}(\overline{F}) + \widehat{\Delta N}_{ij}(\overline{F}),$$

where the differenced, filtered, and equalized noise spectrum, $\widehat{\Delta N}_{ij}$, is $$\widehat{\Delta N}_{ij}(\overline{F}) = \hat{\chi}(F,t_j)\hat{\chi}(F,t_i)\hat{n}_S(F,t_i) - \hat{\chi}(F,t_i)\hat{\chi}(F,t_j)\hat{n}_S(F,t_j)\hat{H}_S(F,t_j,t_i),$$

and the differenced, filtered, and equalized signal spectrum, $\widehat{\Delta S}_{ij}(\overline{F})$, is $$\widehat{\Delta S}_{ij}(\overline{F}) = \overline{I}_{AS}\hat{W}_{0S}A_{fpaS}\hat{\chi}(F,t_i)\hat{\chi}(F,t_j)STF_S(F,t_i)[\hat{S}_N(M,\overline{F},t_i)] =$$
$$\overline{I}_{AS}\hat{W}_{0S}A_{fpaS}\hat{\chi}(F,t_i)\hat{\chi}(F,t_j)STF_S(F,t_i) \cdot [\hat{B}_N(M,\overline{F},t_i) + \hat{T}_N(M,\overline{F},t_i) - \hat{B}_N(M,\overline{F},t_j) - \hat{T}_N(M,\overline{F},t_j)];$$

For temporally stationary backgrounds and foregrounds the resultant signal spectrum is related to the difference between the normalized moving object variation from the background, $\Delta\hat{T}_N$, by $$\widehat{\Delta S}_{ij}(\overline{F}) = \overline{I}_{AS}\hat{W}_{0S}A_{fpaS}\hat{\chi}(F,t_i)\hat{\chi}(F,t_j)STF_S(F,t_i)[\hat{T}_N(M,\overline{F},t_i) - \Delta\hat{T}_N(M,\overline{F},t_j)].$$

If the object is moving with constant velocity during the integration time of the detectors, then the filtered differenced signal corresponds to $$\widehat{\Delta S}_{ij}(\overline{F}) \equiv \overline{I}_{AS}\hat{W}_{0S}A_{fpaS}\hat{\chi}(\overline{F},t_i)\hat{\chi}(\overline{F},t_j)STF_S(\overline{F},t_i) \cdot$$

$$\frac{\hat{T}_0(M\overline{F})}{\hat{H}(M\overline{F}=0) + \hat{B}(M\overline{F}=0)} \frac{\sin(\pi\overline{F}' \cdot \overline{V}_j\Delta T)}{\pi\overline{F}' \cdot \overline{V}_j\Delta T}[\exp(-2\pi i\overline{F} \cdot \overline{V}(t_i)) -$$

$$\exp(-2\pi i\overline{F} \cdot \overline{V}(t_j))] + \overline{I}_{AS}\hat{W}_{0S}A_{fpaS}\hat{\chi}(\overline{F},t_i)\hat{\chi}(\overline{F},t_j)STF_S(\overline{F},t_i) \cdot$$

$$\left[M^2\int d^2F' \frac{\hat{B}(M[\overline{F}-\overline{F}'])\hat{W}_{TO}(M\overline{F}')}{\hat{H}(M\overline{F}=0) + \hat{B}(M\overline{F}=0)} \frac{\sin(\pi\overline{F}' \cdot \overline{V}\Delta T)}{\pi\overline{F}' \cdot \overline{V}\Delta T}\exp(-2\pi i\overline{F} \cdot \overline{V}(t_i)) +\right.$$

$$\left.-M^2\int d^2F' \frac{\hat{B}(M[\overline{F}-\overline{F}'])\hat{W}_{TO}(M\overline{F}')}{\hat{H}(M\overline{F}=0) + \hat{B}(M\overline{F}=0)} \frac{\sin(\pi\overline{F}' \cdot \overline{V}\Delta T)}{\pi\overline{F}' \cdot \overline{V}\Delta T}\right];$$

SpinAp spatial frequency and temporal frequency domain moving object detection will now be discussed. A simple mathematical representation of the spatial frequency and temporal frequency domain SpinAp moving object detection procedure is obtained by approximating the discrete temporal sampling as a continuum and taking the continuous Fourier transform of the spatial frequency transform for each of the SpinAp individual frames. The Fourier spectrum of the noiseless individual frame measurements is given by $$\hat{O}_S(F, t_j) = \bar{I}_{AS}\hat{W}_0 A_{fpaS} STF_S(F, t_j)\hat{B}_N(M, F) +$$

$$\bar{I}_{AS}\hat{W}_0 A_{fpaS} STF(F, t_j)\frac{\hat{T}_0(M\bar{F})}{\hat{H}(M\bar{F}=0)+\hat{B}(M\bar{F}=0)}\frac{\sin(\pi\bar{F}'\cdot\bar{V}\Delta T)}{\pi\bar{F}'\cdot\bar{V}\Delta T}\exp(-2\pi i\bar{F}\cdot\bar{V}(t_j)) -$$

$$\bar{I}_{AS}\hat{W}_0 A_{fpaS} STF(F, t_j) \cdot$$

$$M^2\int d^2 F'\frac{\hat{B}(M[\bar{F}-\bar{F}'])\hat{W}_{T0}(M\bar{F}')}{\hat{H}(M\bar{F}=0)+\hat{B}(M\bar{F}=0)}\frac{\sin(\pi\bar{F}'\cdot\bar{V}\Delta T)}{\pi\bar{F}'\cdot\bar{V}\Delta T}\exp(-2\pi i\bar{F}\cdot\bar{V}_j(t_j));$$

The temporal Fourier transform of the spatial frequency spectrum of the individual frame is obtained by evaluating the integration, and applying the convolution theorem yielding $$\widetilde{\hat{O}}(\bar{F},f) \equiv \int dt\, \exp(-2\pi i f t)\hat{O}_S(\bar{F},t)$$

$$= \bar{I}_{AS}\hat{W}_0 A_{fpaS}\int dt\, \exp(-2\pi i f t) STF_S(\bar{F},t) S_N(M\bar{F},t)$$

$$= \bar{I}_{AS}\hat{W}_0 A_{fpaS}\int df' \widetilde{STF}_S(\bar{F},f')\hat{S}_N(M\bar{F},f-f'),$$

where $\widetilde{STF}_S$ is the temporal Fourier transform of the SpinAp system transfer function, and $\widetilde{S}_N$ is the temporal and spatial frequency Fourier transforms of the normalized geometrically projected scene spectrum Evaluating the temporal Fourier transform of the normalized geometrically projected scene spectrum, the noiseless temporal frequency transform of the strip aperture measurements, becomes $$\hat{O}_S(\bar{F}, f) = \bar{I}_{AS}\hat{W}_0 A_{fpaS}\cdot\bigg\{\widetilde{STF}_S(\bar{F}, f)B_{Ndc}(M, \bar{F}) +$$

$$\frac{A_{trg\,fpa}(\bar{T}_{fpa}-\bar{B}_{fpa})}{A_{fpa}(\bar{H}_{fpa}+\bar{B}_{fpa})}\hat{W}_{TNO}(M,\bar{F})\frac{\sin(\pi\bar{F}\cdot\bar{V}\Delta T)}{\pi\bar{F}\cdot\bar{V}\Delta T}\widetilde{STF}_S(\bar{F}, f-\bar{F}\cdot\bar{V}) +$$

$$\frac{A_{trg\,fpa}\bar{B}_{fpa}}{A_{fpa}(\bar{H}_{fpa}+\bar{B}_{fpa})}\cdot$$

$$A_{fpa}\int d^2 F'\hat{W}_{TNO}(M,\bar{F}')\frac{\sin(\pi\bar{F}'\cdot\bar{V}\Delta T)}{\pi\bar{F}'\cdot\bar{V}\Delta T}\Delta\hat{B}_{NO}(M[\bar{F}-\bar{F}'])\widetilde{STF}_S(\bar{F}, f-\bar{F}'\cdot\bar{V})\bigg\};$$

The first equation above defining $\hat{O}_S(F,t_j)$ is used to determine the signal component of the temporal and spatial frequency matched filters. The matched filter essentially eliminates the temporally stationary components, since the first term of equation for $\hat{O}(F,f)$ contains all temporally stationary effects and is zero for all nonzero spatial frequencies, Simplified signature's for uniform background, foreground, and moving object will now be discussed. Prediction of receiver operating characteristics for SpinAp moving object detection procedures can be simplified for the special case of observational scenarios associated with uniform intensity backgrounds, foregrounds, and moving objects. Indeed, the design of coarse moving object detection approaches may utilize such simplifying assumptions. The temporally stationary and spatially uniform components of the background and foreground can be expressed as, $$B(\bar{r},t) \equiv B_0 \equiv B_{SCN}\text{ and }H(\bar{r},t) \equiv H_0 \equiv H_{SCN}$$

where $B_{SCN}$ is the average background intensity in scene coordinates, and $H_{SCN}$ is the average foreground intensity in scene coordinates.

Focal plane average values and Fourier transforms will now be discussed. The geometrical projection of the average values of the scene's background and foreground intensities are $$B_{fpa}(\bar{r}, t) \equiv \frac{B_0}{M^2} = \frac{\overline{B_{scn}}}{M^2} = \overline{B_{fpa}}$$

and $$H_{fpa}(\bar{r}, t) \equiv \frac{H_0}{M^2} = \frac{\overline{H_{scn}}}{M^2} = \overline{H_{fpa}},$$

and the corresponding Fourier transforms are $$\hat{B}(M\bar{F}) \equiv \overline{B_{scn}}\delta(M\bar{F}) = \frac{1}{M^2}\overline{B_{scn}}\delta(\bar{F}) = \overline{B_{fpa}}\delta(\bar{F})$$

-continued $$\hat{H}(M\bar{F}) \equiv \overline{H_{scn}}\delta(M\bar{F}) = \frac{1}{M^2}\overline{H_{scn}}\delta(\bar{F}) = \overline{H_{fpa}}\delta(\bar{F})$$

where use has been made of the Fourier transforms of the backgrounds in the scene coordinate system $$\hat{B}(\bar{F}) \equiv B_0\delta(\bar{F}) = B_{scn}\delta(\bar{F}),\text{ and }\hat{H}(\bar{F},t) \equiv H_0\delta(\bar{F}) = H_{scn}\delta(\bar{F})$$

and the Fourier transform similarity theorem.

Zero spatial frequency relationships to mean values will now be discussed. The normalized geometrical projection of the scene spectrum is generated by dividing the Fourier transform of the geometrical projection of the scene by the zero spatial frequency component of the geometrically projected scene spectrum. The geometrically projected zero spatial frequency component of the background's, and moving object's intensities can be expressed in terms of the spatially averaged mean values and the geometrical projected area of the backgrounds and object, as $$\hat{T}(M\bar{F}=0,t) = \bar{T}_{fpa}A_{trg\,fpa},\ \hat{B}(M\bar{F}=0,t) = \bar{B}_{fpa}A_{fpa},\ \hat{H}(M\bar{F}=0,t) = \bar{H}_{fpa}A_{fpa},$$

where $A_{trg\,fpa}$ is the approximate instantaneous geometrically projected area of the moving object, $A_{fpa}$ is the approximate detected area of the background in the focal plane of the SpinAp sensor, and the overline symbol (--) refers to a spatial average in the focal plane array.

Zero spatial frequency relationships for the object inverse silhouette will now be discussed. Applying the Fourier transform definition to the object inverse silhouette in the scene coordinates, and transforming to the image plane coordinates by a change of variables given by $Mr_{scene} = R_{image}$, yields $$\hat{W}_T(M\overline{F}, t) = \int_{scene} d^2 r W_T(r, t) \exp(-2\pi i M\overline{F} \cdot r) =$$

$$\frac{1}{M^2} \int_{fpa} d^2 R W_T(\overline{R}/M, t) \exp(-2\pi i \overline{F} \cdot R).$$

Therefore, the geometrical projection of the moving object's zero spatial frequency component can also be related to the object's effective area in the focal plane by $$\hat{W}_T(M\overline{F} = 0, t) = \frac{1}{M^2} \int_{fpa} d^2 R W_T(\overline{R}/M, t) = \frac{A_{trg\,fpa}}{M^2}.$$

Normalized spectra for constant foreground and background will now be discussed. Applying the preceding relationships for the uniform background components of the scene enables determination of mathematical expression for the normalized background and normalized object. Recognizing the ratio of the sum of background and foreground projected scene spectra to their zero spatial frequency component to be $$\frac{\hat{H}(M\overline{F}) + \hat{B}(M\overline{F})}{\hat{H}(M\overline{F}=0) + \hat{B}(M\overline{F}=0)} = \frac{\overline{H_{fpa}} + \overline{B_{fpa}}\delta(\overline{F})}{(\overline{H_{fpa}} + \overline{B_{fpa}})A_{fpa}} = \frac{\delta(\overline{F})}{A_{fpa}}$$

yields the total normalized scene background given $$\hat{B}_N(M\overline{F}, t) \equiv \hat{B}_N(M\overline{F}) \approx \frac{\delta(\overline{F})}{A_{fpa}\left\{1 + \frac{A_{trg\,fpa}(\overline{T_{fpa}} - \overline{B_{fpa}})}{A_{fpa}(\overline{H_{fpa}} + \overline{B_{fpa}})}\right\}}.$$

In like manner, the normalized object difference from the background, $\hat{T}_N$, for temporally stationary and spatially uniform backgrounds can be expressed as $$\Delta \hat{T}_N(M, \overline{F}, t) =$$

$$\frac{\frac{\hat{T}(M, \overline{F}, t)}{A_{fpa}(\overline{H_{fpa}} + \overline{B_{fpa}})} - M^2 \int d^2 F' \frac{\hat{B}(M[\overline{F}-\overline{F}'])}{A_{fpa}(\overline{H_{fpa}} + \overline{B_{fpa}})} \hat{W}_T(M, \overline{F}, t)}{1 + \frac{A_{trg\,fpa}(\overline{T_{fpa}} - \overline{B_{fpa}})}{A_{fpa}(\overline{H_{fpa}} + \overline{B_{fpa}})}}.$$

Uniform object approximation will now be discussed. In scene coordinates, a uniform object can be represented as a product of the object's inverse silhouette, $W_T$, with the object's constant intensity level, $T_0$, i.e.

$$T(r,t) = T_0 W_T(r,t).$$

Therefore, the Fourier transform of a uniform object is $$T(\overline{F}, t) = T_{scn} W_T(\overline{F}, t),$$

and the corresponding geometrically projected transform of the uniform object is $$T(M, \overline{F}, t) = T_{scn} W_T(M\overline{F}, t).$$

Thus, for uniform objects and backgrounds, the normalized object variation from the background, $\Delta \hat{T}_n$, for temporally stationary scenes is given by $$\Delta \hat{T}_n(M\overline{F}, t) =$$

$$\frac{\frac{T_{scn}(M\overline{F}, t)}{A_{fpa}(\overline{H_{fpa}} + \overline{B_{fpa}})} - \frac{M^2}{M^2}\int d^2 F' \frac{\overline{B_{scn}}(\delta[\overline{F}-\overline{F}'])}{A_{fpa}(\overline{H_{fpa}} + \overline{B_{fpa}})} \hat{W}_T(M\overline{F}', t)}{1 + \frac{A_{trg\,fpa}(\overline{T_{fpa}} - \overline{B_{fpa}})}{A_{fpa}(\overline{H_{fpa}} + \overline{B_{fpa}})}} =$$

$$\frac{(\overline{T_{fpa}} - \overline{B_{fpa}}) A_{trg\,fpa} \hat{W}_{TN}(M\overline{F}, t)}{(\overline{H_{fpa}} + \overline{B_{fpa}}) A_{fpa}\left\{1 + \frac{A_{trg\,fpa}(\overline{T_{fpa}} - \overline{B_{fpa}})}{A_{fpa}(\overline{H_{fpa}} + \overline{B_{fpa}})}\right\}}$$

where the normalized inverse silhouette is defined to be $$\hat{W}_{TN}(M\overline{F}, t) = \frac{\hat{W}_T(M\overline{F}, t)}{\hat{W}_{TN}(M\overline{F}=0, t)} = \frac{\hat{W}_T(M\overline{F}, t)}{\frac{A_{trg\,fpa}}{M^2}},$$

and the zero spatial frequency component of the normalized inverse silhouette is $$\hat{W}_T(M\overline{F}=0, t) = \frac{A_{trg\,fpa}}{M^2}.$$

Applying the Fourier transform shift theorem to describe an object moving at constant velocity the object inverse silhouette is $$\hat{W}_{TN}(M\overline{F}, t) = \hat{W}_{TN}(M\overline{F}, t_0)\exp(-2\pi i \overline{F} \cdot \overline{V}t) \equiv \hat{W}_{TNo}(M, \overline{F})\exp(-2\pi i \overline{F} \cdot \overline{V}t)$$

where $\hat{W}_{TNo}(M\overline{F}) = \hat{W}_{TN}(M\overline{F}, t_0)$ is the normalized object's inverse silhouette's Fourier transform at time $t_0 = 0$. The resulting expression for the object variation from the backgrounds is $$\Delta \hat{T}_n(M, \overline{F}, t) = \frac{(\overline{T_{fpa}} - \overline{B_{fpa}}) A_{trg\,fpa} \hat{W}_{TNO}(M, \overline{F}) \exp(-2\pi i \overline{F} \cdot \overline{V}t)}{(\overline{H_{fpa}} + \overline{B_{fpa}}) A_{fpa}\left\{1 + \frac{A_{trg\,fpa}(\overline{T_{fpa}} - \overline{B_{fpa}})}{A_{fpa}(\overline{H_{fpa}} + \overline{B_{fpa}})}\right\}}.$$

The differenced and filtered moving object spatial frequency signature for uniform objects and backgrounds $\Delta \hat{S}_{ij}$, is therefore $$\Delta \hat{S}_{ij}(\overline{F}) \equiv \overline{I}_{AS} \hat{W}_{0S} A_{fpaS} \hat{\chi}(F, t_i) \hat{\chi}(F, t_j) STF_S(F, t_i) [\hat{S}_N(M\overline{F}, t_i) - \hat{S}_N(M\overline{F}, t_j)]$$

$$= \overline{I}_{AS} \hat{W}_{0S} A_{trg\,fpa} \hat{\chi}(F, t_i) \hat{\chi}(F, t_j) STF_S(F, t_i)$$

$$\frac{\sin(\pi \overline{F} \cdot \overline{V} \Delta T)(\overline{T_{fpa}} - \overline{B_{fpa}})}{\pi \overline{F} \cdot \overline{V} \Delta T (\overline{H_{fpa}} + \overline{B_{fpa}})} \cdot$$

$$\frac{\hat{W}_{TNO}(M\overline{F})}{1 + \frac{A_{trg\,fpa}(\overline{T_{fpa}} - \overline{B_{fpa}})}{A_{fpa}(\overline{H_{fpa}} + \overline{B_{fpa}})}} \{\exp(-2\pi i \overline{F} \cdot \overline{V}(t_i)) -$$

$$\exp(-2\pi i \overline{F} \cdot \overline{V}(t_j))\}$$

The spatial domain differenced signal for uniform object, background, and foreground will now be discussed. Inverse Fourier transforming the moving object's differenced and filtered spatial frequency spectrum, produces the spatial domain moving object signature, which is $$\Delta S_{ij}(\overline{R}) = \int d^2 F \exp(-2\pi i \overline{F} \cdot \overline{R}) \Delta \hat{S}_{ij}(\overline{F})$$

$$= \frac{\bar{I}_{AS} \hat{W}_{0S} A_{trg\,fpa}(\overline{T}_{fpa} - \overline{B}_{fpa})}{1 + \frac{A_{trg\,fpa}(\overline{T}_{fpaS} - \overline{B}_{fpaS})}{A_{fpa}(\overline{H}_{fpaS} + \overline{B}_{fpaS})}(\overline{H}_{fpa} + \overline{B}_{fpa})} \cdot$$

$$\int d^2 F \exp(-2\pi i \overline{F} \cdot \overline{R}) \hat{\chi}(F, t_i) \hat{\chi}(F, t_j)$$

$$STF_S(F, t_i) \frac{\sin(\pi \overline{F} \cdot \overline{V} \Delta T)(\overline{T}_{fpa} - \overline{B}_{fpa})}{\pi \overline{F} \cdot \overline{V} \Delta T (\overline{H}_{fpa} + \overline{B}_{fpa})} \cdot$$

$$\hat{W}_{TNO}(M\overline{F}) \{\exp(-2\pi i \overline{F} \cdot \overline{V}(t_i)) -$$

$$\exp(-2\pi i \overline{F} \cdot \overline{V}(t_j))\};$$

The differenced detector mean signal to RMS noise ratio will now be discussed. The mean differenced signal to RMS differenced noise ratio at location $\overline{R}$ for uniform objects and backgrounds can be expressed as $$SNR_{ij}(\overline{R}) = \frac{\Delta S_{ij}(\overline{R}_m)}{\sqrt{\langle \Delta N_{ij}(\overline{R}_m) \Delta N^*_{ij}(\overline{R}_m) \rangle}} = \frac{\Delta S_{ij}(\overline{R}_m)}{\sigma_{\Delta N_{ij}(\overline{R}_m)}}$$

$$= \frac{\bar{I}_{AS} \hat{W}_{0S} \frac{A_{trg\,fpa}(\overline{T}_{fpaS} - \overline{B}_{fpaS})}{(\overline{H}_{fpaS} + \overline{B}_{fpaS})}}{\sqrt{\frac{A_{dS} \lambda Z \lambda Z}{4 D_x \Delta x_S D_y \Delta y_S} \sigma^2_{dS} \left\{1 + \frac{A_{trg\,fpa}(\overline{T}_{fpaS} - \overline{B}_{fpaS})}{A_{fpa}(\overline{H}_{fpaS} + \overline{B}_{fpaS})}\right\}}} \cdot$$

$$\left( \begin{array}{l} \int d^2 F \exp(-2\pi i \overline{F} \cdot \overline{R}) \hat{\chi}(F, t_i) \hat{\chi}(F, t_j) STF_S(F, t_i) \cdot \\ \frac{\sin(\pi \overline{F} \cdot \overline{V} \Delta T)}{\pi \overline{F} \cdot \overline{V} \Delta T} \hat{W}_{TNO}(M\overline{F}) \{e^{-2\pi i F \cdot V(t_i)} - e^{-2\pi i F \cdot V(t_j)}\} \end{array} \right) \div$$

$$\sqrt{\int d^2 F \exp(-2\pi i \overline{F} \cdot (\overline{R}_m - \overline{R}_m))\{1 + |\hat{H}(F, t_i, t_j)|^2\} \hat{\chi}(F, t_i) \hat{\chi}(F, t_j)};$$

where <. . . > denotes noise ensemble averaging, and the differenced noise variance $\sigma^2_{\Delta N_{ij}}(\overline{R}_m)$ may be obtained by analytic procedures described with reference to spatially white noise.

Any differenced synthesized pair signal spectrum for uniform objects and backgrounds is now respresented. The noise free spatial frequency domain signature for any pair of differenced synthesized images associated with uniform objects and backgrounds is given by $$\overline{O}_{syn\,BA}(\overline{F}) = \overline{O}_{syn\,B}(\overline{F}) - \overline{O}_{syn\,A}(\overline{F})$$

$$= \frac{\bar{I}_{AF} \hat{W}_{0F} A_{fpF}(\overline{F}) A_{trp\,fpa}(\overline{T}_{fpa} - \overline{B}_{fpaS})}{\left(\sum_{j=1}^{N_{rf}(\overline{F})} STF_S(\overline{F}, t_{j1})\right)^{A_{fpa}(\overline{H}_{fpaS} + \overline{B}_{fpaS})}} \cdot$$

$$\left\{ \begin{array}{l} \sum_{j=1}^{N_{rf}(\overline{F})} STF_S(\overline{F}, t_j) \frac{\sin(\pi \overline{F}' \cdot \overline{V}_j \Delta T)}{\pi \overline{F}' \cdot \overline{V}_j \Delta T} \exp(-2\pi i \overline{F} \cdot \overline{V}_j(t_j)) - \\ \sum_{k=1}^{N_{rf}(\overline{F})} STF_S(\overline{F}, t_k) \frac{\sin(\pi \overline{F}' \cdot \overline{V}_k \Delta T)}{\pi \overline{F}' \cdot \overline{V}_k \Delta T} \exp(-2\pi i \overline{F} \cdot \overline{V}_k(t_k)) \end{array} \right\} \hat{W}_{TNO}(M\overline{F}).$$

and the corresponding spatial domain moving object of any two differenced synthesized images is $$\Delta \overline{O}_{BA}(\overline{R}, \delta T) = \int d^2 F \overline{O}_{BA}(\overline{F}) \exp(-2\pi i \overline{F} \cdot \overline{R})$$

$$= \bar{I}_{AF} \hat{W}_{0F} A_{fpF} \frac{A_{trg\,fpa}(\overline{T}_{fpaS} - \overline{B}_{fpaS})}{A_{fpa}(\overline{H}_{fpaS} + \overline{B}_{fpaS})} \cdot \int d^2 F \exp$$

$$(-2\pi i \overline{F} \cdot \overline{R}) \frac{STF_F(\overline{F})}{\sum_{j=1}^{N_{rf}(\overline{F})} STF_S(\overline{F}, t_{j1})} \cdot \hat{W}_{TNO}(M\overline{F}) \cdot$$

$$\sum_{j=1}^{N_{rf}(\overline{F})} STF_S(\overline{F}, t_j) \frac{\sin(\pi \overline{F} \cdot \overline{V}_j \Delta T)}{\pi \overline{F} \cdot \overline{V}_j \Delta T} \exp(-2\pi i \overline{F} \cdot \overline{V}_j(t_j)) -$$

$$\sum_{k=1}^{N_{rf}(\overline{F})} STF_S(\overline{F}, t_k) \frac{\sin(\pi \overline{F} \cdot \overline{V}_k \Delta T)}{\pi \overline{F} \cdot \overline{V}_k \Delta T} \exp(-2\pi i \overline{F} \cdot \overline{V}_k(t_k))$$

$$= \bar{I}_{AS} \hat{W}_{0S} A_{trg\,fpa} \frac{A_{trg\,fpa}(\overline{T}_{fpaS} - \overline{B}_{fpaS})}{A_{fpa}(\overline{H}_{fpaS} + \overline{B}_{fpaS})} \cdot \int d^2 F \exp(2\pi i \overline{F} \cdot \overline{R})$$

$$\frac{\sin(\pi \overline{F} \cdot \overline{V}_k \Delta T) STF_F(\overline{F})}{\pi \overline{F} \cdot \overline{V}_k \Delta T \sum_{j=1}^{N_{rf}(\overline{F})} STF_S(\overline{F}, t_j)} \cdot$$

$$\left\{ \sum_{j=1}^{N_{rf}(\overline{F})} STF_S(\overline{F}, t_j) \exp(-2\pi i \overline{F} \cdot \overline{V}_j(t_j)) \right\} \hat{W}_{TNO}(M\overline{F}) +$$

$$-\left\{ \sum_{k=1}^{N_{rf}(\overline{F})} STF_S(\overline{F}, t_k) \exp(-2\pi i \overline{F} \cdot \overline{V}_k(t_k)) \right\} \hat{W}_{TNO}(M\overline{F}).$$

Matched filter nomenclature will now be discussed. The best possible performing detection processor, for wide classes of performance criteria, has been established to be an array of generalized matched filters with a comparison device, which will be referred to as a comparator. The design of the optimum matched filter arrays for SpinAp moving object detection processors requires incorporating knowledge of the unique signal measurement characteristics of the SpinAp sensor, the desired data processing before input into the matched filter array, and the anticipated object phenomenology. The a priori object knowledge can be either statistical or deterministic in nature, including physical parameters, such as, shape, size, velocity, acceleration, background to object contrast ratio, signal to noise ratio, number of objects, number of track crossings, noise cross-covariance, etc. The matched filters of the array for a particular signature can be expressed in matrix notation as, $$F = S^t C_{NN}^{-1}$$

where S is the a priori noiseless signal vector, and $C_{NN}^{-1}$ is the noise cross-covariance matrix inverse. Both the signal and noise cross-covariance matrices are appropriately defined for the desired moving object detection data processing method.

The signal matrix resulting from any of the combinations of differenced frames, differenced synthesized images, temporal frequency variations or other signatures as determined to be appropriate for SpinAp moving object detection may be represented as $$S = \begin{pmatrix} S_1 \\ S_2 \\ \vdots \\ S_{n_{signal}} \end{pmatrix} = \begin{pmatrix} S(\bar{\xi}_1) \\ S(\bar{\xi}_2) \\ \vdots \\ S(\bar{\xi}_{n_{signal}}) \end{pmatrix}$$

where ξ refers to any or all combinations of independent spatial, spatial frequency, temporal, and temporal frequency signal coordinates associated with the a priori statistical or deterministic SpinAp moving object signature.

Likewise, the noise matrix resulting from any of the combinations of differenced frames, differenced synthesized images, temporal frequency variations or other appropriate signatures as determined to be appropriate for SpinAp moving object detection can be represented as $$N = \begin{pmatrix} N_1 \\ N_2 \\ \vdots \\ N_{n_{signal}} \end{pmatrix} = \begin{pmatrix} N(\bar{\xi}_1) \\ N(\bar{\xi}_2) \\ \vdots \\ N(\bar{\xi}_{n_{signal}}) \end{pmatrix}$$

The set of noisy measurements can therefore be represented in matrix notation as the sum of signal and noise components, yielding $$M = \begin{pmatrix} M_1 \\ M_2 \\ \vdots \\ M_{n_{signal}} \end{pmatrix} = \begin{pmatrix} S(\bar{\xi}_1) \\ S(\bar{\xi}_2) \\ \vdots \\ S(\bar{\xi}_{n_{signal}}) \end{pmatrix} + \begin{pmatrix} N(\bar{\xi}_1) \\ N(\bar{\xi}_2) \\ \vdots \\ N(\bar{\xi}_{n_{signal}}) \end{pmatrix}$$

Complex functioned matched filters can be constructed by recognizing the signal and noise matrix elements are the real and imaginary parts (or amplitude and phase parts) of the complex signal and noise, respectively.

For example, the signal and noise matrices for any number of differenced frames, or differenced synthesized images within the spatially shifting matched filter acquisition "window" would be represented by $$S = \begin{pmatrix} S_1 \\ \vdots \\ S_{n_{signal}} \end{pmatrix} = \begin{pmatrix} \Delta S_{12}(\bar{R}_1) \\ \Delta S_{12}(\bar{R}_2) \\ \vdots \\ \Delta S_{12}(\bar{R}_{n_{now}}) \\ \vdots \\ \Delta S_{13}(\bar{R}_1) \\ \Delta S_{13}(\bar{R}_2) \\ \vdots \\ \Delta S_{13}(\bar{R}_{n_{now}}) \\ \vdots \\ \Delta S_{\alpha\beta}(\bar{R}_1) \\ \Delta S_{\alpha\beta}(\bar{R}_2) \\ \vdots \\ \Delta S_{\alpha\beta}(\bar{R}_{n_{now}}) \end{pmatrix}$$

and $$N = \begin{pmatrix} N_1 \\ \vdots \\ N_{n_{signal}} \end{pmatrix} = \begin{pmatrix} \Delta N_{12}(\bar{R}_1) \\ \Delta N_{12}(\bar{R}_2) \\ \vdots \\ \Delta N_{12}(\bar{R}_{n_{now}}) \\ \vdots \\ \Delta S_{13}(\bar{R}_1) \\ \Delta N_{13}(\bar{R}_2) \\ \vdots \\ \Delta N_{13}(\bar{R}_{n_{now}}) \\ \vdots \\ \Delta N_{\alpha\beta}(\bar{R}_1) \\ \Delta N_{\alpha\beta}(\bar{R}_2) \\ \vdots \\ \Delta N_{\alpha\beta}(\bar{R}_{n_{now}}) \end{pmatrix}$$

respectively, where $n_{now}$ refers to the number of total elements in the spatial matched filter acquisition window.

The matched filter output: The matched filter output therefore corresponds to the noise free matched filter signal and additive "whitened" noise, or $$M_{out} = FM = S^t C_{NN}^{-1}(S+N).$$

Matched filter receiver operating characteristics for Gaussian noise will now be discussed. The receiver operating characteristics (ROC) for the SpinAp matched filter moving object detection processing methods utilizing a comparator and a threshold exceedence decision approach can be readily determined for approximately Gaussian individual frame measurement noise. The probability of detection and probability of false alarms for the SpinAp matched filter output for a given threshold can be determined from $$P_{det} = \frac{1}{2}\left\{1 + erf\left[\frac{\sqrt{S^t C_{NN}^{-1}}}{2\sqrt{2}} - \frac{\ln K}{\sqrt{2 S^t C_{NN}^{-1} S}}\right]\right\}$$

where ln K is the threshold parameter of the comparator, and $$P_{fa} = \frac{1}{2}\left\{1 - erf\left[\frac{\sqrt{S^t C_{NN}^{-1}}}{2\sqrt{2}} - \frac{\ln K}{\sqrt{2S^t C_{NN}^{-1} S}}\right]\right\}$$

respectively.

For zero mean individual frame noise, $<\hat{n}_s(\overline{R},t_i)>=0$, $<\hat{n}_s(\overline{R},t_j)>=0<\hat{n}_s(\overline{F},t_i)>=0$, $<\hat{n}_s(\overline{F},t_j)>=0$, and $<\Delta N_{ij}(\overline{R})>=0=<\Delta N_{ij}(\overline{F})>$.

The spatial noise cross-covariance will now be discussed. The spatial noise cross-covariance between any two pairs of differenced, equalized, and filtered frames at pixel locations $\overline{R}_m$ and $\overline{R}_n$ is $$\langle \Delta r_{ij}(\overline{R}_m) \Delta r_{kl}^*(\overline{R}_n) \rangle = \int d^2 F \int d^2 F' \exp[-2\pi i(\overline{F} \cdot \overline{R}_m - \overline{F}' \cdot \overline{R}'_n)] \cdot$$

$$\left\{\begin{array}{l} \hat{H}(\overline{F}, t_j, t_i)\hat{H}^*(F', t_1, t_k)\langle \hat{n}_S(\overline{F}, t_j)\hat{n}_S^*(\overline{F}', t_1) \rangle + \langle \hat{n}_S(\overline{F}, t_i)\hat{n}_S^*(\overline{F}', t_k) \rangle - \\ \hat{H}^*(\overline{F}, t_1, t_k)\langle \hat{n}_S(\overline{F}, t_j)\hat{n}_S^*(\overline{F}', t_1) \rangle - \hat{H}(F, t_j, t_i)\langle \hat{n}_S(F, t_j)\hat{n}_S^*(F', t_k) \rangle \end{array}\right\}.$$

$$\hat{\chi}(\overline{F}, t_i)\hat{\chi}(\overline{F}, t_j)\hat{\chi}(\overline{F}', t_k)\hat{\chi}(\overline{F}', t_1);$$

$$\int d^2 F \int d^2 F' \exp 2\pi i \overline{F} \cdot \overline{R}_m - \overline{F}' \cdot \overline{R}_n\bigg)$$

$$\{\hat{H}F, t_i, t_j)\hat{H}^* F', t_l, t_k\rangle\langle \hat{n}_S(F, t_i)\hat{n}_S^*(F, t_l) \rangle +$$

$$\hat{H}(F, t_i, t_j)\langle \hat{n}_S F, t_j)\hat{n}_S^*(F, t_k) \rangle\}\hat{a}\overline{F}, t_i)$$

$$\hat{\chi}(\overline{F}, t_j\hat{\chi}|\overline{F}, t_k)\hat{\chi}(\overline{F}, t_l),$$

SpinAp differenced noise cross-covariance matrix elements will now be discussed. Determination of the noise optimal SpinAp moving object detection matched filters depends upon a priori knowledge or assumptions concerning the noise processes and noise propagation from the measurement steps to the matched filter. The classes of SpinAp moving object detection procedures described elsewhere in this disclosure utilize individual weighted frame differences, synthesized frame differences, or temporal and spatial frequency matched filters. The determination of the appropriate propagated noise cross-covariance matrix elements is required to establish the noise optimal matched filters, or the performance of less than noise optimal techniques. The following sections provide example techniques for determining the appropriate SpinAp noise covariance matrix elements. Covariance matrix elements associated with processing steps not explicitly described can follow similar methods and procedures of determination.

The noise spectrum for any pairwise differenced frames will now be discussed. One embodiment of the SpinAp moving object detection processing method differences any distinct pair of system transfer function equalized, and overlap passband filtered individual frames. The corresponding differenced, equalized, and filtered noise spectrum, $N_{ij}$, is $$\widetilde{\Delta N}_{ij}(\overline{F}) \equiv \hat{\chi}(F,t_i)\hat{\chi}(F,t_j)\hat{n}_S(F,t_i) - \hat{\chi}(F,t_i)\hat{\chi}(F,t_j)\hat{n}_S(F,t_j)\hat{H}(F,t_j,t_i).$$

The individual pixel noise associated with position $\overline{R}$ is obtained by performing an inverse Fourier transform of the processed noise spectrum, and is $$\Delta N_{ij}(\overline{R}) \equiv \int d^2 F \Delta \hat{N}_{ij}(\overline{F}) \exp(2\pi i \overline{F} \cdot \overline{R})$$

$$= \int d^2 F \exp(2\pi i \overline{F} \cdot \overline{R}) \hat{\chi}(F, t_i) \hat{\chi}(F, t_j)$$

$$\{\hat{n}_S(F, t_i) - \hat{n}_S(F, t_j)\hat{H}(F, t_j, t_i)\};$$

where the super script * refers to complex conjugation.

The effects of zero mean, temporally stationary and uncorrelated noise will now be discussed. For zero mean, temporally stationary, and temporally uncorrelated noise, the individual frame noise spectrum cross covariance is related to the noise power spectral density $\hat{C}_{nn}$ by $$\langle \hat{n}_S(F, t_j)\hat{n}_S^*(F', t_i) \rangle = \delta_{i,j} \hat{C}_{nn}(\overline{F}) \delta(\overline{F}' - \overline{F});$$

where $\delta_{i,j}$ and $\delta(\overline{F}-\overline{F})$ are the Kronecker and Dirac delta functions, respectively.

Substituting individual frame noise spectrum cross covariance into the expression for the spatial differenced and filtered noise covariance produces $$\langle \Delta N_{ij}(\overline{R}_m) \Delta N_{kl}^*(\overline{R}_n) \rangle = \int d^2 F \int d^2 F' e^{-2pi(F \cdot R_m - F' \cdot R_n)} \cdot$$

$$\{\hat{H}(\overline{F}, t_i, t_j)\hat{H}^*(\overline{F}, t_1, t_k)\delta_{j,1} + \delta_{j,k} -$$

$$\hat{H}^*(\overline{F}, t_i, t_j)\delta_{i,1} - \hat{H}(\overline{F}, t_j, t_i)\delta_{j,k}\} \cdot$$

$$\hat{\chi}(\overline{F}, t_i)\hat{\chi}(\overline{F}, t_j)\hat{\chi}(\overline{F}', t_k)\hat{\chi}(\overline{F}', t_1)$$

$$C_{nn}(\overline{F})\delta(\overline{F} - \overline{F}');$$

A special case corresponding to the pixel to pixel cross-covariance for a single filtered and equalized frame difference is obtained by letting the frame indices take the values $i=k,j=1$, and $i\neq j$. The corresponding effective noise spatial cross covariance is:

$$\langle \Delta N_{ij}(\overline{R}_m) \Delta N_{ij}^*(\overline{R}_n) \rangle =$$

$$\int d^2 F \exp(-2\pi i \overline{F} \cdot (\overline{R}_m - \overline{R}_n))\{1 + |\hat{H}(\overline{F}, t_i, t_j)|^2\}\hat{\chi}(\overline{F}, t_i)\hat{\chi}(\overline{F}, t_j)\hat{C}_{nn}(\overline{F});$$

Spatially white noise and Nyquist sampling will now be discussed. For spatially white noise, and Nyquist sampling of the optics passband the individual SpinAp frame noise power spectral density can be approximated as $$\hat{C}_{nn}(\overline{F}) = \frac{A_{dS} \lambda Z \lambda Z}{4 D_x \Delta x_S D_y \Delta y_S} \overline{\sigma_{dS}^2}$$

where $\lambda$ is the wavelength, Z is the effective optical system focal length, $D_x$ and $D_y$ are the aperture sizes in the x and y directions, respectively, $\Delta x_S$ and $\Delta_{yS}$ are spatial sampling increments, which for 100% fill factor focal plane detector arrays corresponds to the detector spacing, and $\overline{\sigma_{dS}^2}$ is the mean noise variance on an individual detector. Substituting individual white noise power spectral density cross covariance into the expression for the spatial differenced and filtered noise covariance produces $$\langle \Delta N_{ij}(\overline{R}_m) \Delta N_{kl}^*(\overline{R}_n) \rangle = \frac{A_{dS} \lambda Z \lambda Z}{4 D_x \Delta x_S D_y \Delta y_S} \overline{\sigma_{dS}^2} \int d^2 F e^{-2\pi i \overline{F} \cdot (\overline{R}_m - \overline{R}_n)} \cdot$$

$$\{\hat{H}(\overline{F}, t_j, t_i) \hat{H}^*(\overline{F}, t_1, t_k) \delta_{j,1} + \delta_{i,k} -$$

$$\hat{H}^*(\overline{F}, t_1, t_k) \delta_{i,1} - \hat{H}(\overline{F}, t_1, t_i) \delta_{j,k}\} \cdot$$

$$\hat{\chi}(\overline{F}, t_i) \hat{\chi}(\overline{F}, t_j) \hat{\chi}(\overline{F}, t_k) \hat{\chi}(\overline{F}, t_1).$$

The special case corresponding to the pixel to pixel cross-covariance for a single filtered and equalized frame difference is $$\langle \Delta N_{ij}(\overline{R}_m) \Delta N_{kl}^*(\overline{R}_n) \rangle \equiv \frac{A_{dS} \lambda Z \lambda Z}{4 D_x \Delta x_S D_y \Delta y_S} \overline{\sigma_{dS}^2} \int d^2 F \exp(-2\pi i \overline{F} \cdot$$

$$(\overline{R}_m - \overline{R}_n))\{1 - |\hat{H}(\overline{F}, t_j, t_i)|^2\} \hat{\chi}(\overline{F}, t_i) \hat{\chi}(\overline{F}, t_j).$$

Pi-wise differences and the covariance matrix elements and white noise will now be discussed. One further simplifying example, which for ideal system transfer functions has the processing advantage of not requiring system transfer function equalization, corresponds to differencing frames that are $\pi$ radians apart. For an ideal rectangular strip aperture, the system transfer functions for two frames $\pi$ radians apart frames provide identical contrast performance, and therefore the equalization filter is exactly unity, or $\hat{H}(\overline{F},t_j,t_i)=1$, and the overlap passbands are identical. Therefore for spatially white, and temporally uncorrelated noise, the cross covariance noise matrix elements are $$<\Delta N_{ij}(\overline{R}_m) \Delta N_{k1}^*(\overline{R}_n)> \equiv C_{NN}|_{i,j} = 2\overline{\sigma_{dS}^2} \delta_{i,j}$$

or the covariance matrix can be represented by $$C_{NN} = \overline{2\sigma_{dS}^2} I$$

where I is the identity matrix. The inverse of the cross covariance matrix is therefore $$C_{NN}^{-1} = \frac{1}{2\overline{\sigma_{dS}^2}} I$$

The synthesized noise spectrum will now be discussed. Another embodiment of the SpinAp moving object detection processing method differences any distinct pair of SpinAp synthesized images. As described in U.S. Pat. No. 5,243,351, synthesized noise spectrum for the simplest form of synthesis process is $$\hat{n}_{syn}(\overline{F}) = \hat{\Lambda}(\overline{F}) \hat{n}_{S\,ave}(\overline{F})$$

where the spatial frequency redundancy averaged noise $\hat{n}_{S\,ave}(\overline{F})$, is given by $$\hat{n}_{S\,ave}(\overline{F}) = \frac{1}{N_{rf}(\overline{F})} \sum \hat{n}_S(\overline{F}, t_j).$$

The differenced synthesized noise spectrum will now be discussed. Given the synthesized noise spectrum, the noise spectrum, $\Delta \hat{n}_{syn}(\overline{F})$, for any pair (not necessarily derived from completely distinct data sets) of synthesized images is $$\Delta \hat{n}_{syn}(\overline{F}) = \hat{\Lambda} \Delta \hat{n}_{S\,ave}(\overline{F}).$$

where $\Delta \hat{n}_{S\,ave}(\overline{F})$ is $$\Delta \hat{n}_{Save}(\overline{F}) = \frac{1}{N_{rf}(\overline{F})} \sum_{j=1}^{N_{rf}(\overline{F})} \hat{n}_{SB}(\overline{F}, t_j) - \frac{1}{N_{rf}(\overline{F})} \sum_{k=1}^{N_{rf}(\overline{F})} \hat{n}_{SA}(\overline{F}, t_k)$$

where the subscripts A and B refer to the SpinAp individual frame sets that were used to generate the synthesized images.

Spatial domain differenced synthesized noise will now be discussed. Performing the inverse Fourier transform of the differenced synthesized noise spectrum, generates the spatial domain synthesized noise at pixel location $\overline{R}$, $$n_{syn}(\overline{R}) = \int d^2 F \hat{n}_{syn}(\overline{F}) \exp(2\pi i \overline{F} \cdot \overline{R}) = \int d^2 F \hat{n}_{Save}(\overline{F}) \hat{\Lambda}(\overline{F}) \exp(2\pi i \overline{F} \cdot \overline{R});$$

Spatial domain differenced synthesized noise covariance will now be discussed. The pixel to pixel cross-covariance for the synthesized noise difference can be expressed in terms of the SpinAp synthesizer and the cross covariance of the redundancy averaged differenced noise spectrum, or $$\langle \Delta N_{syn}(\overline{R}_m) \Delta N_{syn}^*(\overline{R}_n) \rangle =$$

$$\left\langle \int d^2 F \hat{\Lambda}(\overline{F}) \hat{n}_{Save}(\overline{F}) \exp(2\pi i \overline{F} \cdot \overline{R}_m) \int d^2 F \hat{\Lambda}^*(\overline{F}') \hat{n}_{Save}^*(\overline{F}') \exp - \right.$$

$$(2\pi i \overline{F}' \cdot \overline{R}_n) \rangle;$$

$$\int d^2 F \int d^2 F' \exp 2\pi i (\overline{F} \cdot \overline{R}_m - \overline{F}' \cdot \overline{R}_n) \hat{\Lambda}^* (\overline{F}') \langle \hat{n}_{Save}(\hat{F}) \hat{n}_{Save}^*(\overline{F}') \rangle$$

where the redundancy averaged differenced noise spectrum is $$\langle \hat{n}_{Save}(\hat{F}) \hat{n}_{Save}^*(\overline{F}') \rangle =$$

$$\left\langle \left\{ \frac{1}{N_{rf}(\overline{F})} \sum_{j=1}^{N_{rf}(\overline{F})} \hat{n}_{SB}(\overline{F}, t_j) - \frac{1}{N_{rf}(\overline{F})} \sum_{k=1}^{N_{rf}(\overline{F})} \hat{n}_{SA}(\overline{F}, t_k) \right\} \cdot \right.$$

$$\left. \left\{ \frac{1}{N_{rf}(\overline{F}')} \sum_{j=1}^{N_{rf}(\overline{F}')} \hat{n}_{SB}^*(\overline{F}', t_l) - \frac{1}{N_{rf}(\overline{F}')} \sum_{k=1}^{N_{rf}(\overline{F}')} \hat{n}_{SA}^*(\overline{F}', t_m) \right\} \right\rangle$$

$$= \frac{1}{N_{rf}(\overline{F}) N_{rf}(\overline{F}')} \sum_{j=1}^{N_{rf}(\overline{F})} \sum_{l=1}^{N_{rf}(\overline{F}')} \langle \hat{n}_{SB}(\overline{F}, t_j) \hat{n}_{SB}^*(\overline{F}', t_l) \rangle +$$

$$+\frac{1}{N_{rf}(\bar{F})N_{rf}(\bar{F}')}\sum_{k=1}^{N_{rf}(\bar{F})}\sum_{m=1}^{N_{rf}(\bar{F}')}\langle\hat{n}_{SA}(\bar{F},t_k)\hat{n}_{SA}^*(\bar{F}',t_m)\rangle+$$

$$-\frac{1}{N_{rf}(\bar{F})N_{rf}(\bar{F}')}\sum_{j=1}^{N_{rf}(\bar{F})}\sum_{l=1}^{N_{rf}(\bar{F}')}\langle\hat{n}_{SB}(\bar{F},t_j)\hat{n}_{SA}^*(\bar{F}',t_m)\rangle+$$

$$-\frac{1}{N_{rf}(\bar{F})N_{rf}(\bar{F}')}\sum_{k=1}^{N_{rf}(\bar{F})}\sum_{m=1}^{N_{rf}(\bar{F}')}\langle\hat{n}_{SA}(\bar{F},t_k)\hat{n}_{SB}^*(\bar{F}',t_l)\rangle$$

Zero mean, temporally stationary and uncorrelated noise will now be discussed. For zero mean, temporally stationary, and temporally uncorrelated noise the individual frame noise spectrum cross covariance is related to the noise power spectral density $\hat{C}_{NN}$ by where the individual frame times are displayed explicitly and accommodate the potential of synthesizing images based on sets of SpinAp individual frames that may possess common data.

The differenced redundancy averaged noise spectrum correlation will now be discussed. For synthesized images generated from distinct sets of SpinAp individual frames, the noise spectrum cross-covariance for differenced synthesized images is $$\langle\Delta\hat{n}_{save}(\bar{F})\Delta\hat{n}_{save}^*(\bar{F}')\rangle=\hat{C}_{nn}(\bar{F})\delta(\bar{F}'-\bar{F})$$

$$\left\{\frac{1}{N_{rf}(\bar{F})N_{rf}(\bar{F}')}\sum_{j=1}^{N_{rf}(\bar{F})}\sum_{l=1}^{N_{rf}(\bar{F}')}\delta_{j,l}+\right.$$

$$\left.\frac{1}{N_{rf}(\bar{F})N_{rf}(\bar{F}')}\sum_{k=1}^{N_{rf}(\bar{F})}\sum_{m=1}^{N_{rf}(\bar{F}')}\delta_{k,m}\right\}$$

$$=\frac{1}{N_{rf}(\bar{F})N_{rf}(\bar{F}')}\hat{C}_{nn}(\bar{F})\delta(\bar{F}'-\bar{F})\left\{\sum_{j=1}^{N_{rf}(\bar{F}')}+\sum_{k=1}^{N_{rf}(\bar{F}')}\right\}$$

$$=\frac{2}{N_{rf}(\bar{F}')}\hat{C}_{nn}(\bar{F})\delta(\bar{F}'-\bar{F});$$

Therefore, the pixel to pixel differenced synthesized noise for temporally uncorrelated and stationary noise is $$\langle\Delta\hat{n}_{syn}(\bar{R}_m)\Delta\hat{n}_{syn}^*(\bar{R}')\rangle=\int d^2F\int d^2F'\exp[2\pi i(\bar{F}\cdot\bar{R}_m-$$

$$\bar{F}'\cdot\bar{R}_n)]\hat{A}(\bar{F})\hat{A}^*(\bar{F}')\frac{2}{N_{rf}(\bar{F}')}\hat{C}_{nn}(\bar{F})\delta(\bar{F}'-\bar{F})$$

$$=\int d^2F\exp[2\pi i\bar{F}\cdot(\bar{R}_m-\bar{R}_n)]\hat{C}_{nn}(\bar{F})$$

$$|\hat{A}(\bar{F})|^2\frac{2}{N_{rf}(\bar{F}')};\text{ and}$$

and, for temporally uncorrelated, temporally stationary, and spatially white, the spatial differenced synthesized noise cross-covariance matrix is $$\langle\Delta\hat{n}_{syn}(\bar{R}_m)\Delta\hat{n}_{syn}^*(\bar{R}')\rangle=\int d^2F\exp(2\pi i\bar{F}\cdot(\bar{R}_m-$$

$$\bar{R}_n))\hat{C}_{nn}(\bar{F})|\hat{A}(\bar{F})|^2\frac{2}{N_{rf}(\bar{F}')}$$

$$=\frac{A_{dS}}{4}\frac{\lambda Z}{D_x\Delta s_x}\frac{\lambda Z}{D_y\Delta y_x}\overline{\sigma}_{dS}\int d^2F\exp(2\pi i\bar{F}\cdot$$

$$(\bar{R}_m-\bar{R}_n))|\hat{A}(\bar{F})|^2\frac{2}{N_{rf}(\bar{F}')}.$$

Embodiments of the present SpinAp moving object detection system consistent with a realization of the method illustrated in FIGS. 2 and 3 have been reduced to practice and tested. Image data was generated using the embodiment of FIG. 2 to produce a noiseless differenced synthesized moving object signature and a corresponding template matched filter output.

The image data demonstrated a low signal to noise ratio differenced synthesized image containing a faint smear of a moving object, and the output of the template matched filter, thus demonstrating an excellent output signal to noise ratio on the order of 16 to 1. This demonstrates enhanced receiver operating characteristics that are produced using the present invention for this particular class of moving objects. In addition, experimental data has been obtained and used to demonstrate the π-wise moving object detection methods described herein.

Thus, improved spinning strip (partial) aperture imaging radiometers that synthesize equivalent full circular aperture images and detect moving objects from a plurality of rotating strip aperture image measurements, or synthesized image measurements have been disclosed. It is to be understood that the described embodiments are merely illustrative of some of the many specific embodiments which represent applications of the principles of the present invention. Clearly, numerous and varied other arrangements may be readily devised by those skilled in the art without departing from the scope of the invention.

What is claimed is:

1. A spinning strip aperture radiometer sensor system comprising:
   a telescope having a focal plane and comprised of a rotating strip aperture that rotates around an optical axis and that produces temporally sequential images of a scene;
   a two dimensional detector array for detecting images formed at the focal plane of the telescope;
   a signal processor coupled to the two-dimensional detector array for recording a plurality of the temporally sequential images of the scene as the strip aperture rotates around the optical axis of the telescope, for synthesizing images from the plurality of temporally sequential images of the scene, and for simultaneously detecting moving objects found in the temporally sequential images of the scene;
   wherein the signal processor additionally comprises:
      means for correcting line of sight errors in at least two temporally sequential images of the scene to form spatially registered image frames;
      means for spatially Fourier transforming the spatially registered image frames to a common spatial frequency to form spatially transformed frames;
      means for filtering individual spatially transformed frames using a system transfer function equalization filter to form equalized frames;

means for differencing distinct pairs of equalized frames to form difference frames;

means for filtering the difference frames using a non-common passband rejection filter;

means for summing the filtered and difference frames to form a total summed spectrum of filtered differences;

means for inverse transforming the total summed spectra of filtered differences to provide a moving object signature in the spatial domain;

means for processing the moving object signature in the spatial domain through a matched filter array having a plurality of outputs; and means for comparing each of the plurality of outputs of the matched filter array to a corresponding predetermined threshold and declaring a moving object detection when at least one of the outputs of the matched filter array exceeds the corresponding predetermined threshold.

2. A spinning strip aperture radiometer sensor system comprising:

a telescope having a focal plane and comprised of a rotating strip aperture that rotates around an optical axis and that produces temporally sequential images of a scene;

a two dimensional detector array for detecting images formed at the focal plane of the telescope;

a signal processor coupled to the two-dimensional detector array for recording a plurality of the temporally sequential images of the scene as the strip aperture rotates around the optical axis of the telescope, for synthesizing images from the plurality of temporally sequential images of the scene, and for simultaneously detecting moving objects found in the temporally sequential images of the scene;

wherein the signal processor additionally comprises:

means for correcting line of sight errors in the plurality of temporally sequential images of the scene to form a plurality of spatially registered image frames;

means for spatially Fourier transforming the plurality of spatially registered image frames to a common spatial frequency grid to form a plurality of spatially transformed frames;

means for temporally Fourier transforming the plurality of spatially transformed frames to produce a temporal and spatial frequency transformed data set; and means for processing the temporal and spatial frequency transformed data set using a noise optimal matched filter detection processor.

3. The system of claim 2 wherein the noise optimal matched filter detection processor uses a priori knowledge of object phenomenology, signal and noise measurement statistics, and unique measurement characteristics of the spinning strip aperture radiometer sensor system.

4. The system of claim 2 wherein the noise optimal matched filter detection processor comprises template matched filters.

5. The system of claim 2 wherein the noise optimal matched filter detection processor comprises streak detectors.

6. The system of claim 2 wherein the noise optimal matched filter detection processor comprises a single pixel threshold exceedence detection processor.

7. The system of claim 2 wherein the noise optimal matched filter detection processor comprises a multiple pixel threshold exceedence detection processor.

8. A spinning strip aperture radiometer sensor system comprising:

a telescope having a focal plane and comprised of a rotating strip aperture that rotates around an optical axis and that produces temporally sequential images of a scene;

a two dimensional detector array for detecting images formed at the focal plane of the telescope;

a signal processor coupled to the two-dimensional detector array for recording a plurality of the temporally sequential images of the scene as the strip aperture rotates around the optical axis of the telescope, for synthesizing images from the plurality of temporally sequential images of the scene, and for simultaneously detecting moving objects found in the temporally sequential images of the scene;

wherein the signal processor additionally comprises:

means for correcting line of sight errors in the plurality of temporally sequential images of the scene to form a plurality of spatially registered image frames;

means for spatially Fourier transforming the plurality of spatially registered image frames to a common spatial frequency grid to form spatially transformed frames;

means for filtering individual spatially transformed frames using a system transfer function equalization filter to form equalized frames;

means for differencing distinct pairs of equalized frames to form difference frames;

means for filtering the difference frames using a non-common passband rejection filter;

means for inverse transforming the filtered difference frames to provide a moving object signature in the spatial domain;

means for processing the moving object signature in the spatial domain through a matched filter array having a plurality of outputs; and means for comparing each of the plurality of outputs of the matched filter array to a corresponding predetermined threshold and declaring a moving object detection when at least one of the outputs of the matched filter array exceeds the corresponding predetermined threshold.

9. The system of claim 8 wherein the matched filter array uses a priori knowledge of object phenomenology, signal and noise measurement statistics, and unique measurement characteristics of the spinning strip aperture radiometer sensor system.

10. The system of claim 8 wherein the matched filter array comprises template matched filters.

11. The system of claim 8 wherein the matched filter array comprises streak detectors.

12. The system of claim 8 wherein the matched filter array comprises a single pixel threshold exceedence detection processor.

13. The system of claim 8 wherein the matched filter array comprises a multiple pixel threshold exceedence detection processor.

14. An object detection method for use in a spinning strip aperture radiometer sensor system comprising:

rotating a strip aperture about an optical axis of an imaging telescope having a focal plane;

detecting and recording a plurality of the temporally sequential two-dimensional image frames formed at the focal plane as the strip aperture rotates around the optical axis of the telescope;

synthesizing images from the plurality of recorded temporally sequential two-dimensional image frames;

correcting line of sight errors in at least two of the recorded temporally sequential two-dimensional image frames to form line of sight corrected frames;

spatially Fourier transforming the line of sight corrected frames to form spatially transformed frames;

filtering individual spatially transformed frames using a system transfer function equalization filter to form equalized frames;

differencing distinct pairs of equalized frames to form difference frames;

filtering the difference frames using a non-common passband rejection filter;

summing the filtered difference frames to form a total summed spectrum of filtered differences;

inverse transforming the total summed spectrum of filtered differences to provide a moving object signature in the spatial domain; and processing the moving object signature through a matched filter array having a plurality of outputs; and declaring a moving object detection when at least on of the plurality of outputs of the matched filter array exceeds a predetermined threshold.

15. An object detection method for use in a spinning strip aperture radiometer sensor system comprising:

rotating a strip aperture about an optical axis of an imaging telescope having a focal plane;

detecting and recording a plurality of temporally sequential two-dimensional image frames formed at the focal plane as the strip aperture rotates around the optical axis of the telescope;

synthesizing images from the plurality of recorded temporally sequential two-dimensional image frames;

correcting line of sight errors in at least two of the recorded temporally sequentially two-dimensional frames to form line of sight corrected frames;

spatially Fourier transforming the line of sight corrected frames to form spatially transformed frames;

filtering individual spatially transformed frames using a system transfer function equalization filter to form equalized frames;

differencing distinct pairs of equalized frames to form difference frames;

filtering the difference frames using a non-common passband rejection filter;

inverse transforming the filtered difference frames to provide a moving object signature in the spatial domain; and processing the moving object signature in the spatial domain through a matched filter array having a plurality of outputs; and declaring a moving object detection when at least one of the plurality of outputs of the matched filter array exceeds a predetermined threshold.

16. An object detection method for use in a spinning strip aperture radiometer sensor system comprising:

rotating a strip aperture about an optical axis of an imaging telescope having a focal plane;

detecting and recording a plurality of temporally sequential two-dimensional image frames formed at the focal plane as the strip aperture rotates around the optical axis of the telescope;

synthesizing images from the plurality of recorded temporally sequential two-dimensional image frames;

correcting line of sight errors in a temporal sequence of the recorded temporally sequential two-dimensional image frames to form a plurality of spatially registered frames;

spatially Fourier transforming the plurality of spatially registered frames to a common spatial frequency grid to form a plurality of spatially transformed frames;

temporally Fourier transforming the plurality of spatially transformed frames to produce a temporal and spatial frequency transformed data set; and processing the temporal and spatial frequency transformed data set using a noise optimal matched filter detection processor to detect moving objects.

17. The object detection method of claim 16 wherein the noise optimal matched filter detection processor uses a priori knowledge of object phenomenology, signal and noise measurement statistics, and unique measurement characteristics of the spinning strip aperture radiometer sensor system.

18. The object detection method of claim 16 wherein the step of processing the temporal and spatial frequency transformed data set comprises the step of processing the temporal and spatial frequency transformed data set using template matched filters.

19. The object detection method of claim 16 wherein the step of processing the temporal and spatial frequency transformed data set comprises the step of processing the temporal and spatial frequency transformed data set using streak detectors.

20. The object detection method of claim 16 wherein the step of processing the temporal and spatial frequency transformed data set comprises the step of processing the temporal and spatial frequency transformed data set using a single pixel threshold exceedence detection processor.

21. The object detection method of claim 16 wherein the step of processing the temporal and spatial frequency transformed data set comprises the step of processing the temporal and spatial frequency transformed data set using a multiple pixel threshold exceedence detection processor.

* * * * *